DIGITAL MULTIPLYING ARRANGEMENTS FOR AN ELECTRONIC COMPUTER

Filed March 11, 1954 18 Sheets-Sheet 1

EDWARD J. PETHERICK
GEOFFREY C. ROWLEY
Inventors
By Stevens, Davis, Miller & Mosher
Attorneys EDWARD J. PETHERICK,
GEOFFREY C. ROWLEY
*Inventors*
By Stevens, Davis, Miller & Mosher
*Attorneys*

EDWARD J. PETHERICK,
GEOFFREY C. ROWLEY
*Inventors*
By Stevens, Davis, Miller & Mosher
*Attorneys*

EDWARD J. PETHERICK,
GEOFFREY C. ROWLEY
Inventors
By Stevens, Davis, Miller & Mosher
Attorneys EDWARD J. PETHERICK,
GEOFFREY C. ROWLEY
*Inventors*
By Stevens, Davis, Miller & Mosher
*Attorneys*

EDWARD J. PETHERICK
GEOFFREY C. ROWLEY
*Inventors*
By Stevens, Davis, Miller & Mosher
*Attorneys*

EDWARD J. PETHERICK,
GEOFFREY C. ROWLEY
*Inventors*
By Stevens, Davis, Miller & Mosher
*Attorneys*

Nov. 17, 1959 E. J. PETHERICK ET AL 2,913,177

DIGITAL MULTIPLYING ARRANGEMENTS FOR AN ELECTRONIC COMPUTER

Filed March 11, 1954

18 Sheets-Sheet 8

EDWARD J. PETHERICK
GEOFFREY C. ROWLEY
*Inventors*
By Stevens, Davis, Miller & Mosher
*Attorneys*

EDWARD J. PETHERICK
GEOFFREY C. ROWLEY
*Inventors*
By Stevens, Davis, Miller & Mosher
*Attorneys*

EDWARD J. PETHERICK,
GEOFFREY C. ROWLEY
*Inventors*
By Stevens, Davis, Miller & Mosher
*Attorneys*

DIGITAL MULTIPLYING ARRANGEMENTS FOR AN ELECTRONIC COMPUTER

EDWARD J. PETHERICK,
GEOFFREY C. ROWLEY
*Inventors*
By Stevens, Davis, Miller & Mosher
*Attorneys*

Nov. 17, 1959 E. J. PETHERICK ET AL 2,913,177

DIGITAL MULTIPLYING ARRANGEMENTS FOR AN ELECTRONIC COMPUTER

Filed March 11, 1954 18 Sheets-Sheet 12

EDWARD J. PETHERICK,
GEOFFREY C. ROWLEY
*Inventors*

By Stevens, Davis, Miller & Mosher
*Attorneys*

EDWARD J. PETHERICK,
GEOFFREY C. ROWLEY
Inventors
By Stevens, Davis, Miller & Mosher
Attorneys EDWARD J. PETHERICK,
GEOFFREY C. ROWLEY
Inventors
By Stevens, Davis, Miller & Mosher
Attorneys EDWARD J. PETHERICK,
GEOFFREY C. ROWLEY
*Inventors*
By Stevens, Davis, Miller & Mosher
*Attorneys*

EDWARD J. PETHERICK,
GEOFFREY C. ROWLEY
Inventors
By Stevens, Davis, Miller & Mosher
Attorneys EDWARD J. PETHERICK
GEOFFREY C. ROWLEY
*Inventors*
By Stevens, Davis, Miller & Mosher
*Attorneys*

DIGITAL MULTIPLYING ARRANGEMENTS FOR AN ELECTRONIC COMPUTER

Filed March 11, 1954 18 Sheets-Sheet 18

EDWARD J. PETHERICK,
GEOFFREY C. ROWLEY
Inventors
By Stevens, Davis, Miller & Mosher
Attorneys United States Patent Office 2,913,177
Patented Nov. 17, 1959

2,913,177

DIGITAL MULTIPLYING ARRANGEMENTS FOR AN ELECTRONIC COMPUTER

Edward John Petherick, Rowledge, near Farnham, and Geoffrey Charles Rowley, Sutton, England, assignors, by mesne assignments, to International Business Machines Corporation New York, N.Y., a corporation of New York Application March 11, 1954, Serial No. 415,609

Claims priority, application Great Britain March 17, 1953

14 Claims. (Cl. 235—160)

Figure 1:
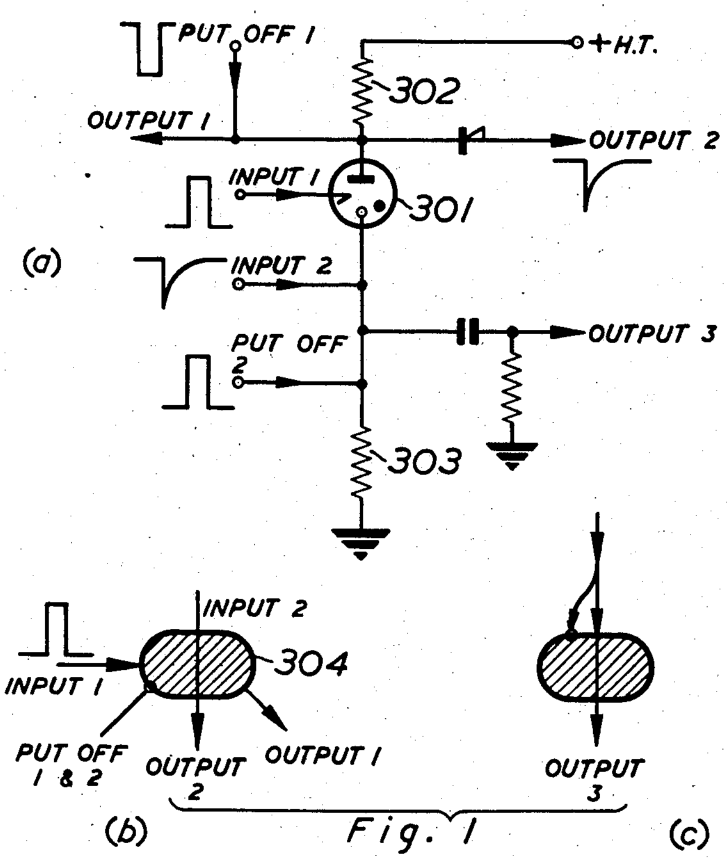

The present invention relates to digital computing engines working in the decimal scale of notation.

According to the present invention, a decimal digital computing engine comprises an accumulator, a register, means for setting up successively on the register in a predetermined order of significance the digits of a multiplier in accordance with a predetermined code, means for inspecting the register to determine if a predetermined multiplier digit is a digit N less than five or a digit $(9-N)$ greater than four and for inspecting the register to determine if the multiplier digit of next less significance to the predetermined multiplier digit is a digit less than five or greater than four and means for carrying out one of the following functions:

(1) If the predetermined multiplier digit is less than five adding (*a*) The Nth multiple of a multiplicand to the accumulator if the next less significant multiplier digit is less than five or (*b*) The $(N+1)$th multiple of the multiplicand to the accumulator if the next less significant multiplier digit is greater than four, or (2) If the predetermined multiplier digit is greater than four effectively subtracting (*a*) The Nth multiple of the multiplicand from the accumulator if the next less significant multiplier digit is greater than four or (*b*) The $(N+1)$th multiple of the multiplicand from the accumulator if the next less significant multiple digit is less than five.

The register may be set up successively in accordance with multiplier digits in a progressively decreasing order of significance or in a progressively increasing order significance.

The register may comprise a first stage including a first gate arranged to be open to pass electrical pulses if a digit set up in the stage is greater than five and a second stage including a second gate arranged to be open to pass electrical pulses if a digit set up in the second stage is greater than five.

According to a feature of the present invention, the computing engine may comprise means for successively setting up the first stage of the register in accordance with each digit of a succession of multiplier digits in a progressively decreasing order of significance, means for shifting the contents of the first stage of the register to the second stage of the register so that the second stage of the register is set up in accordance with the digit according to which the first stage of the register was previously set up, a first trigger connected to the first gate so that a pulse passing through the gate changes the state of the trigger, a second trigger connected to the second gate so that a pulse passing through the gate changes the state of the trigger, means for applying to both of the gates a first pulse before, and a second pulse after, the contents of the first stage has been shifted to the second stage and means for returning the first trigger to a predetermined state before the application of each first pulse.

According to the present invention in another aspect thereof, a method of selecting a mutliplier factor comprises the steps of successively setting up on a register in a predetermined order of significance the digits of a multiplier in accordance with a predetermined code, inspecting the register to determine if a predetermined multiplier digit is a digit N less than five or a digit $(9-N)$ greater than four, inspecting the register to determine if the multiplier digit of next less significance to the multiplier digit is less than five or greater than four, and choosing a multiplier factor F such that (1) If the predetermined multiplier digit is less than five (*a*) F equals N if the next less significant multiplier digit is less than five or (*b*) F equals $(N+1)$ if the next less significant multiplier digit is greater than four, or (2) If the predetermined multiplier digit is greater than four (*a*) F equals minus N if the next less significant multiplier factor is greater than four or (*b*) F equals minus $(N+1)$ if the next less significant multiplier factor is less than five.

Figure 2:
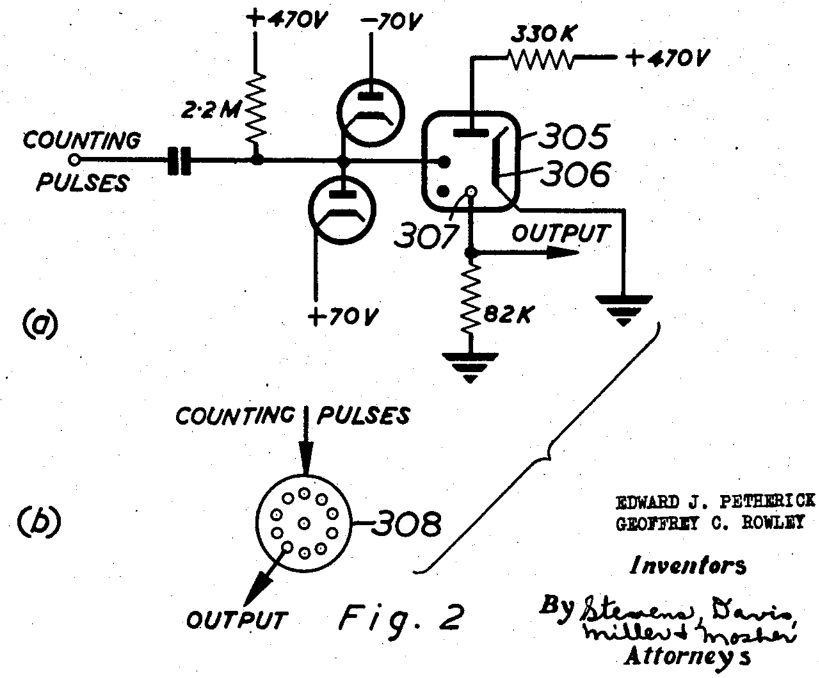
Figure 3:
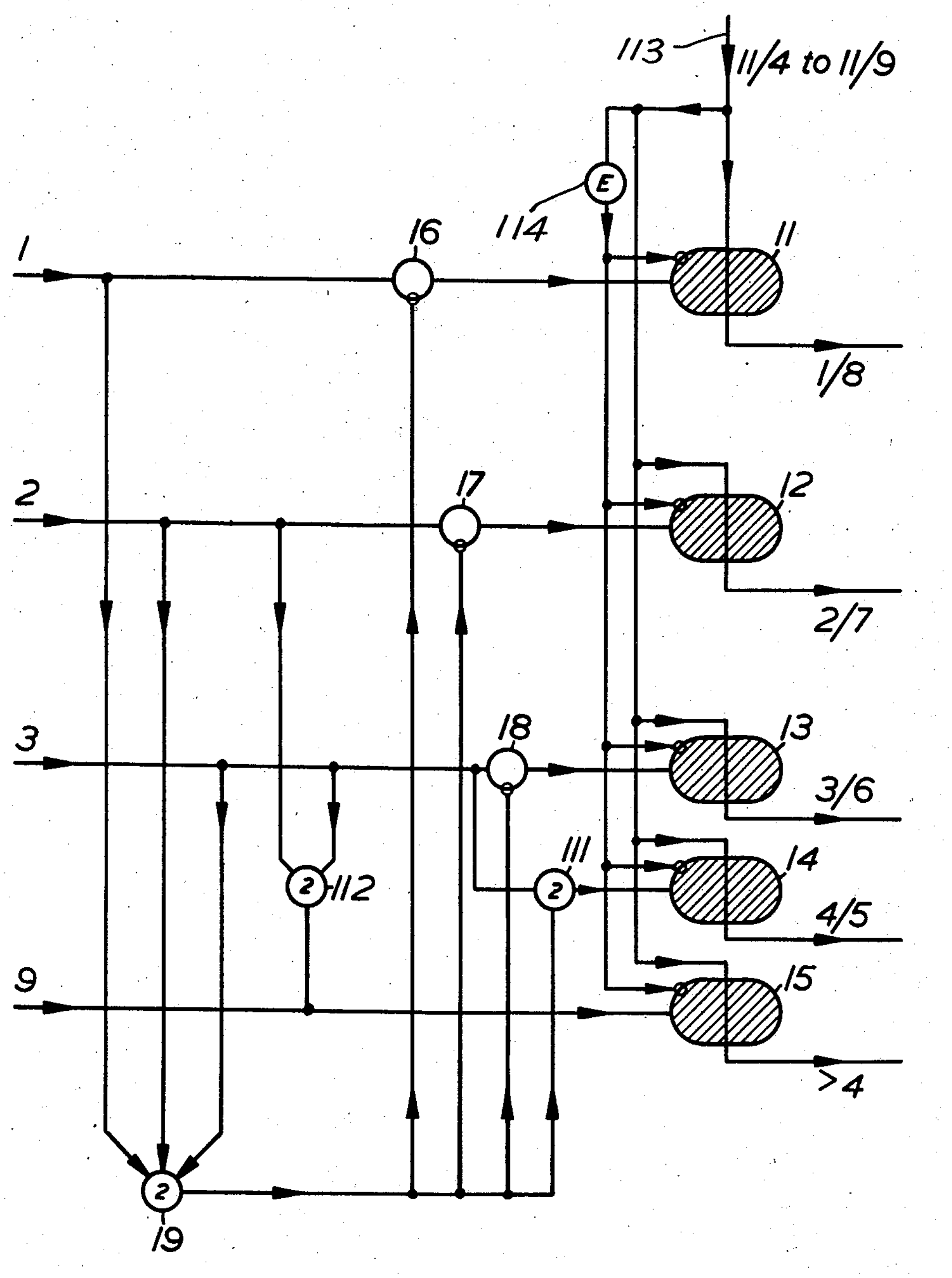
Figure 4:
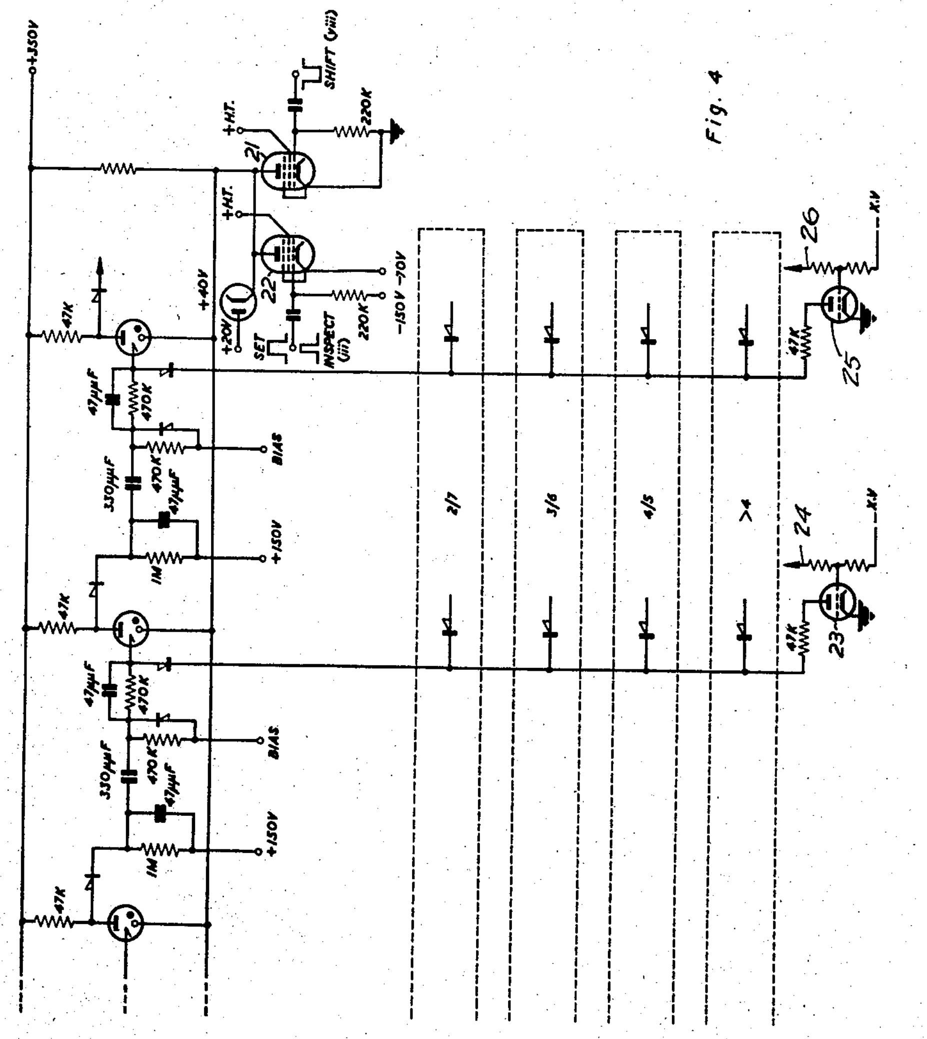
Figure 5:
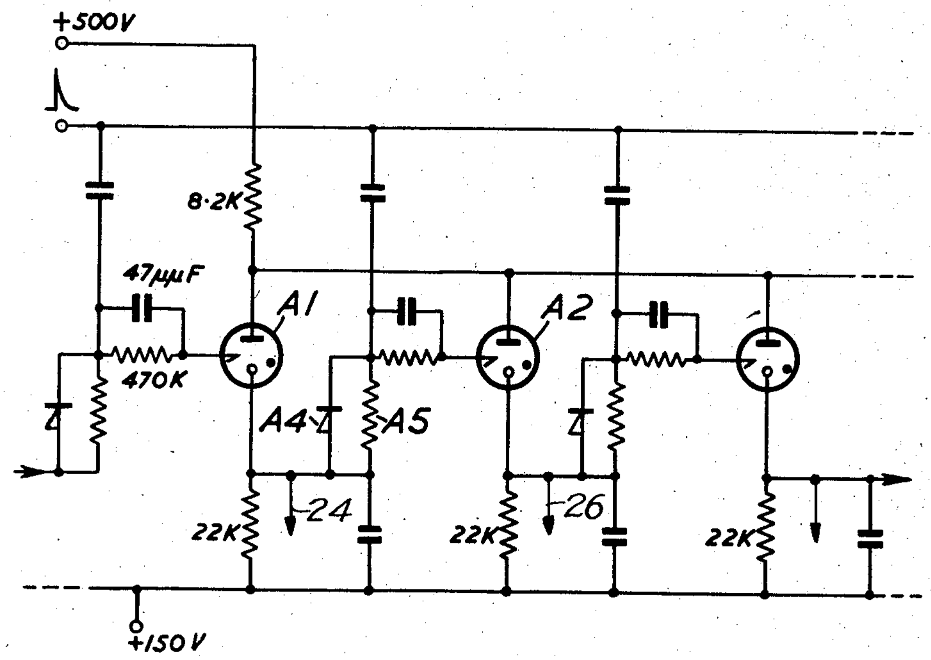
Figure 6:
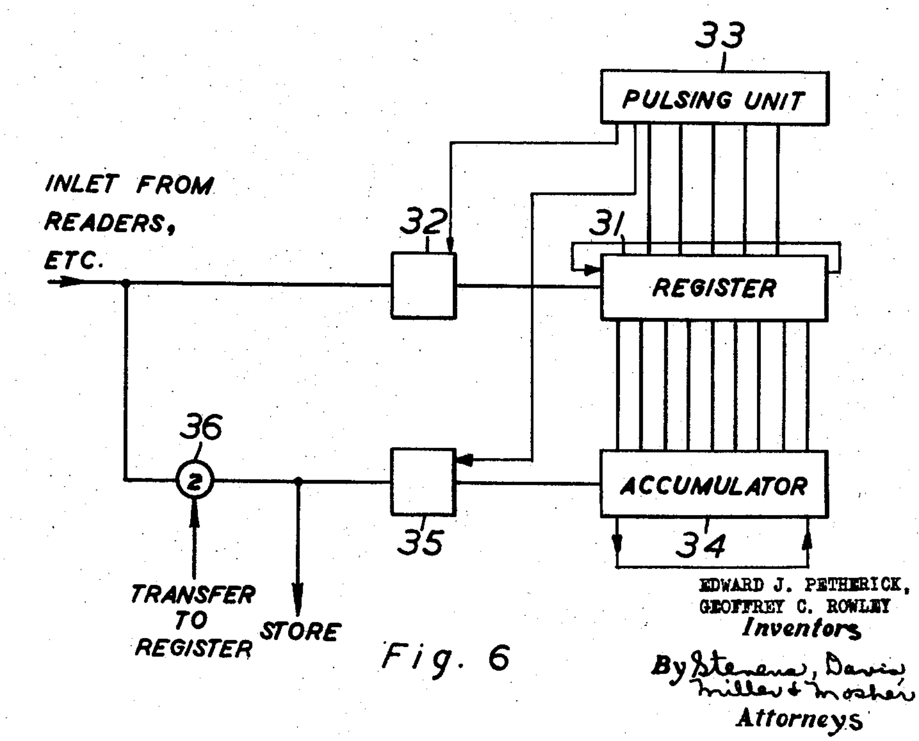
Figure 7:
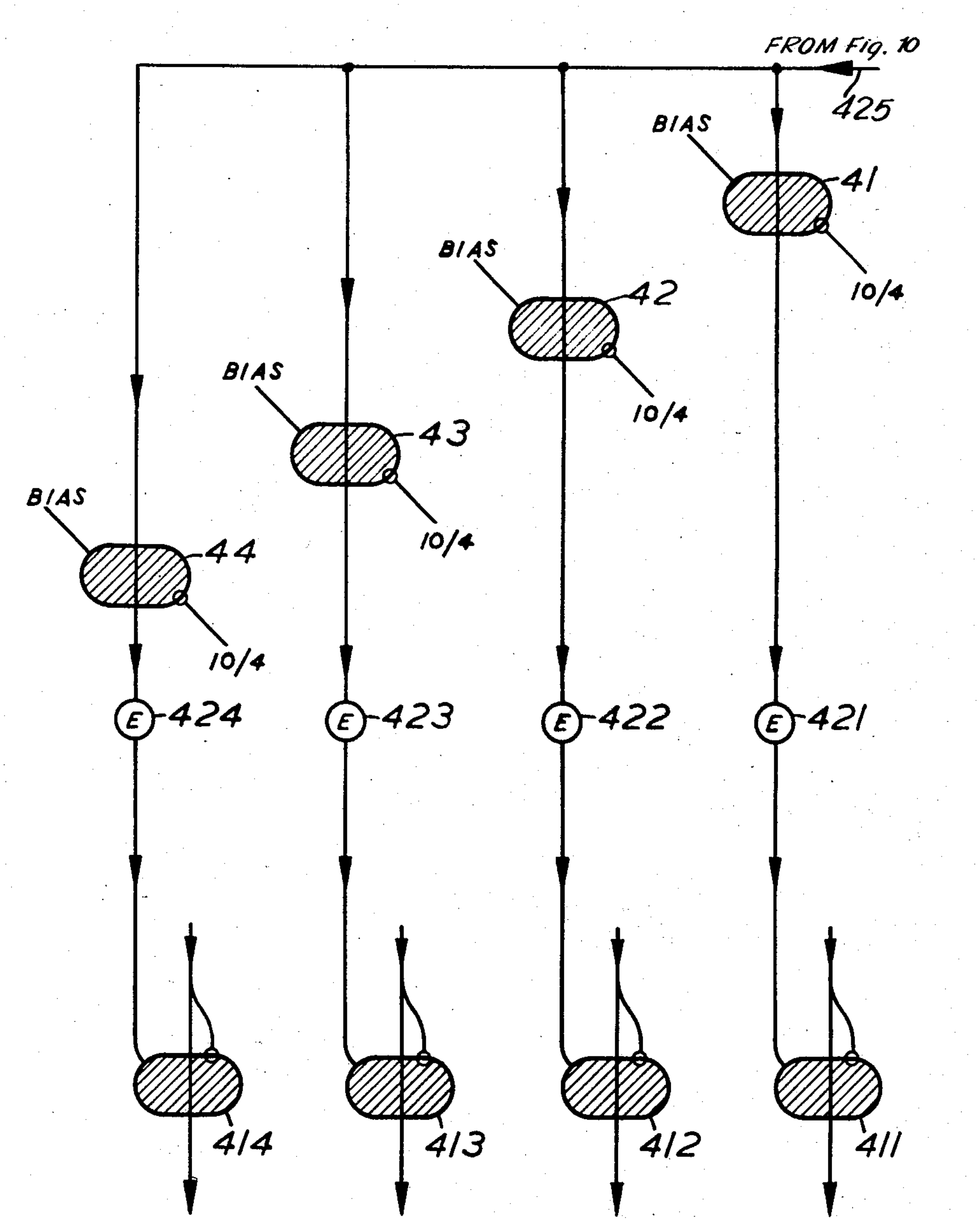
Figure 8:
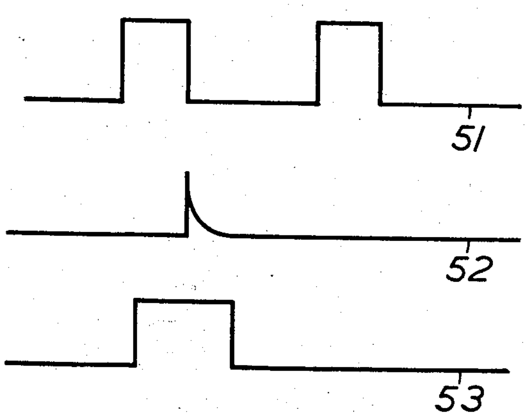
Figure 9:
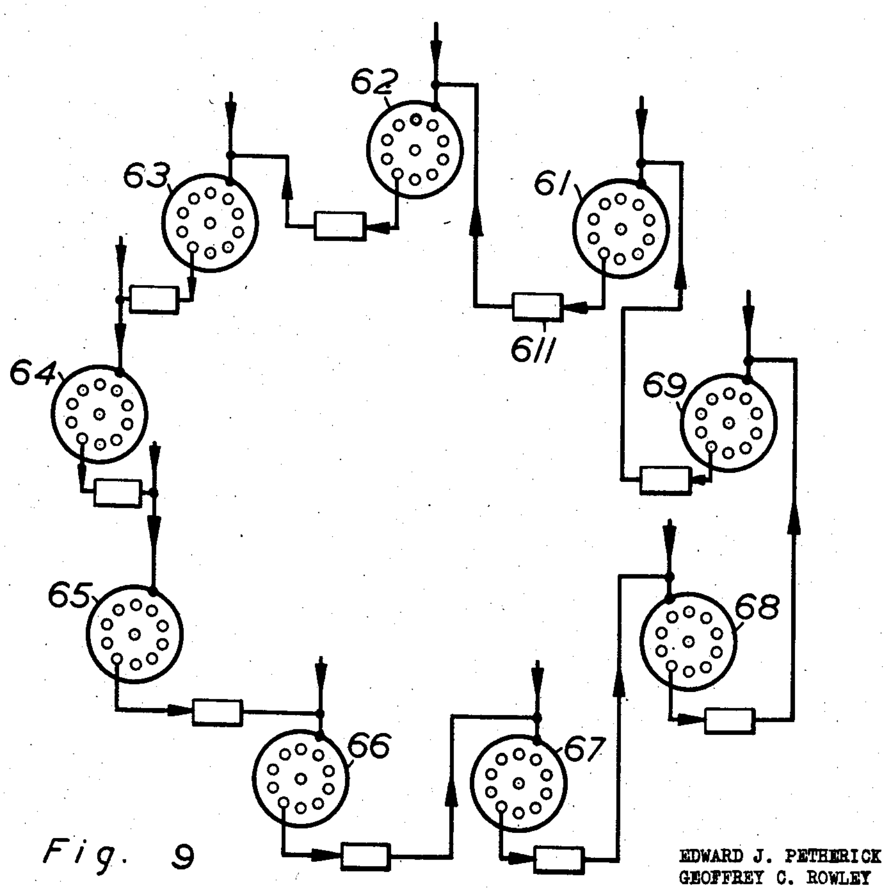
Figure 10:
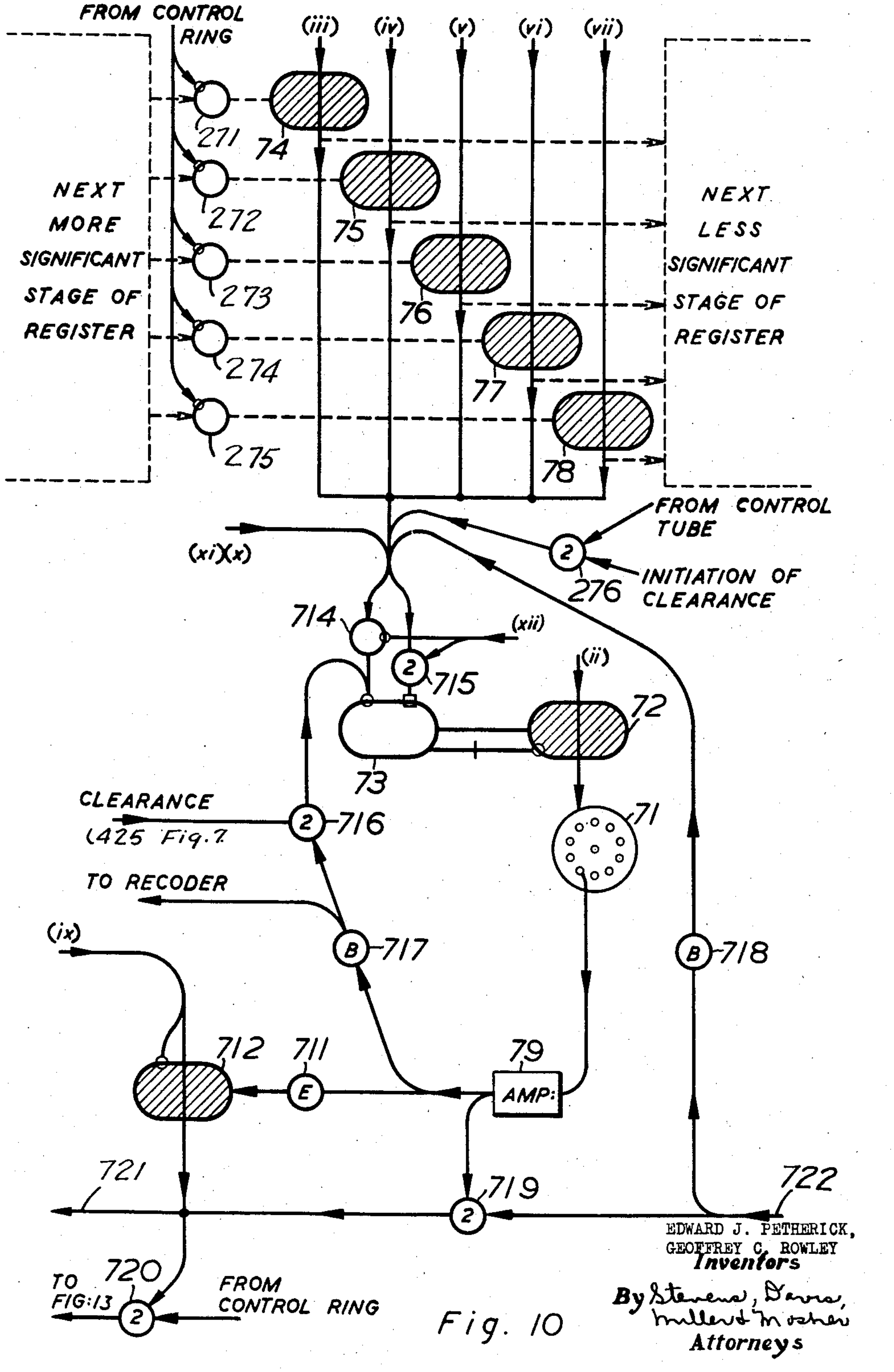
Figure 11:
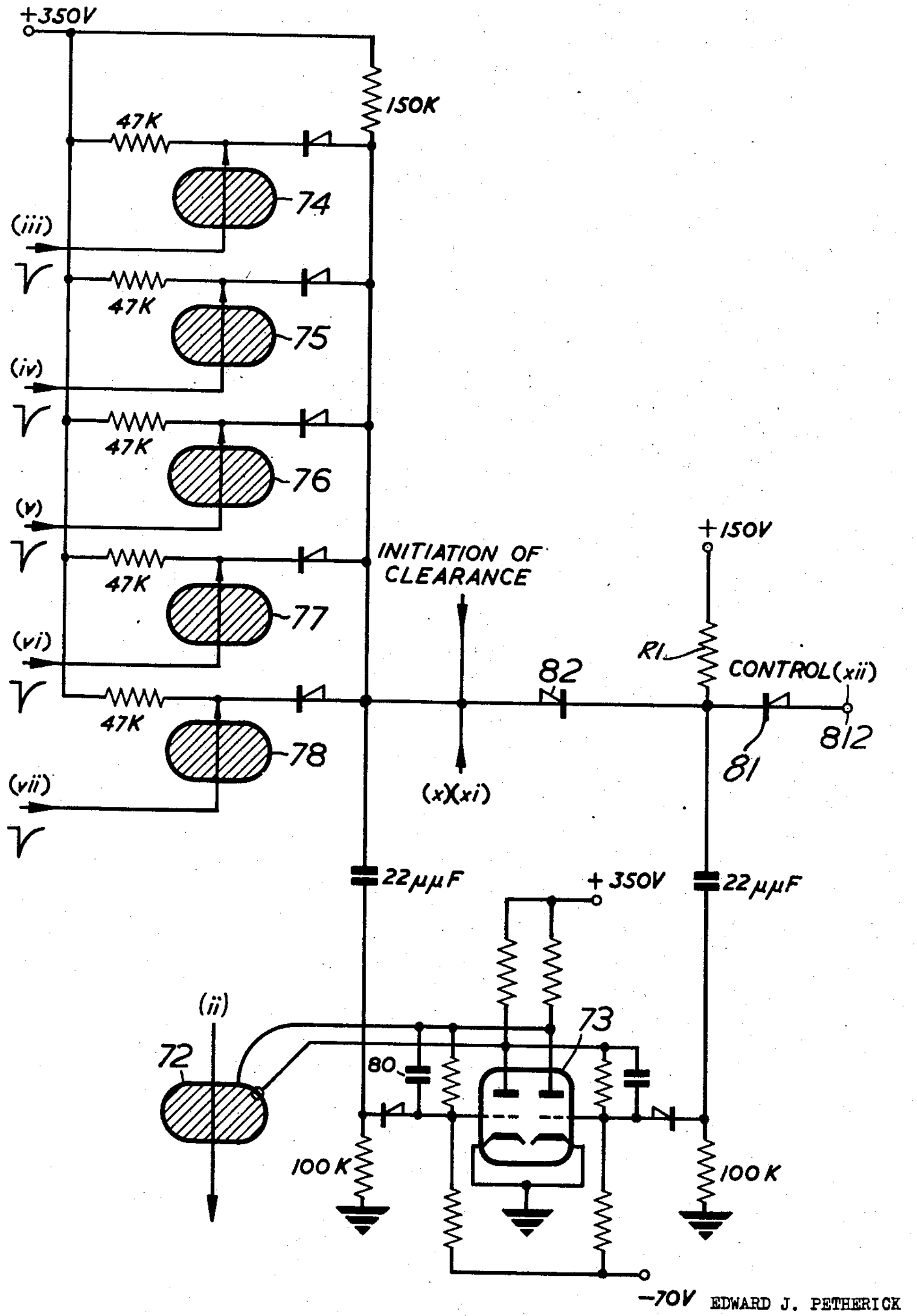
Figure 12A:
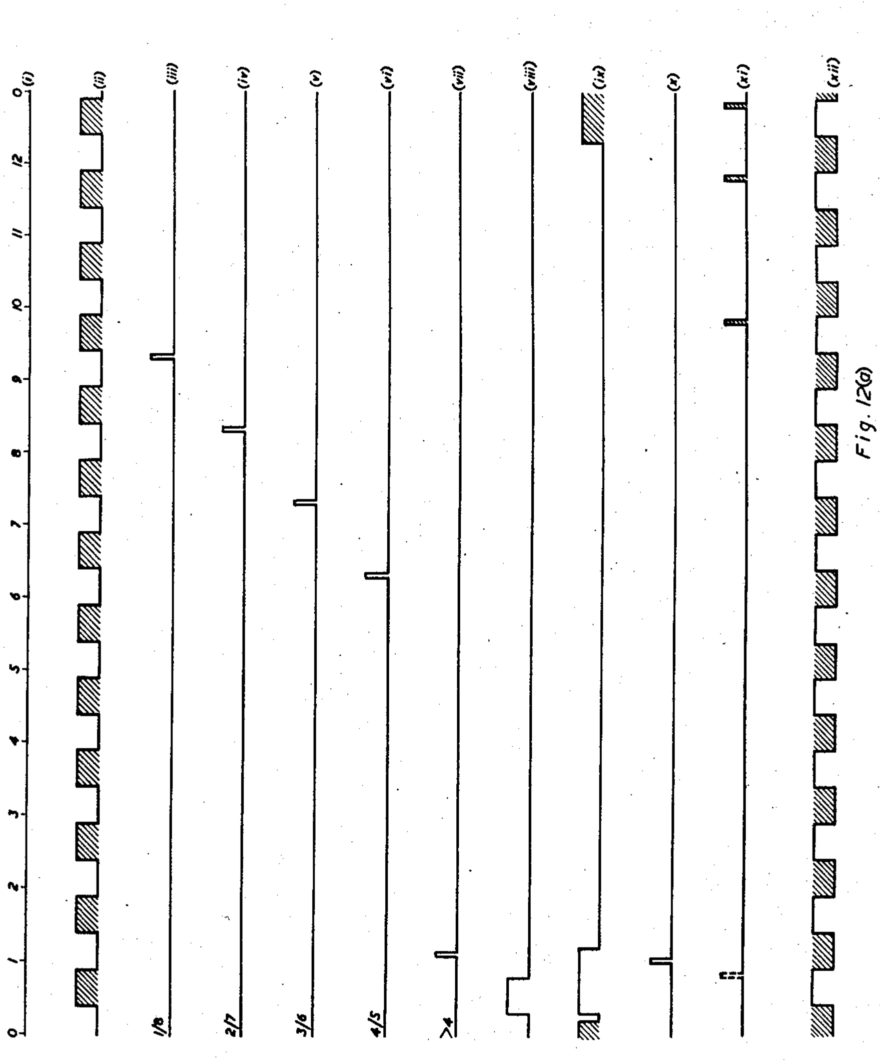
Figure 12B:
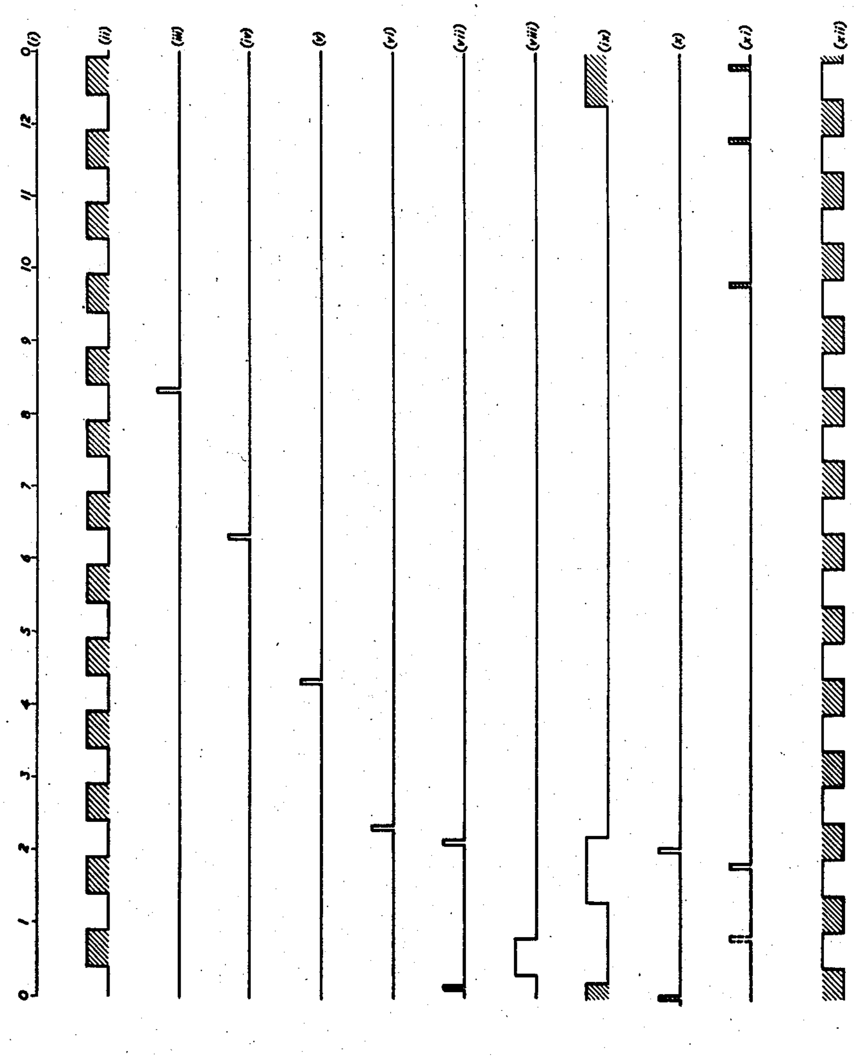
Figure 12C:
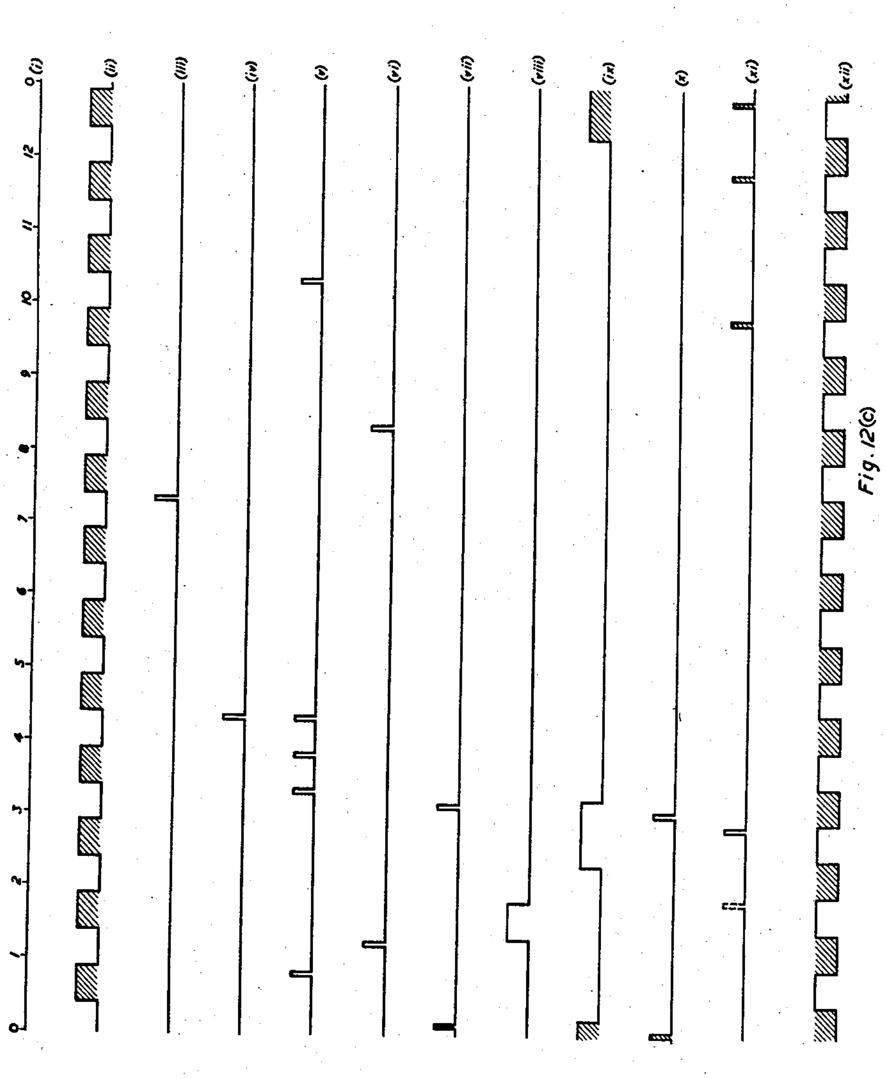
Figure 12D:
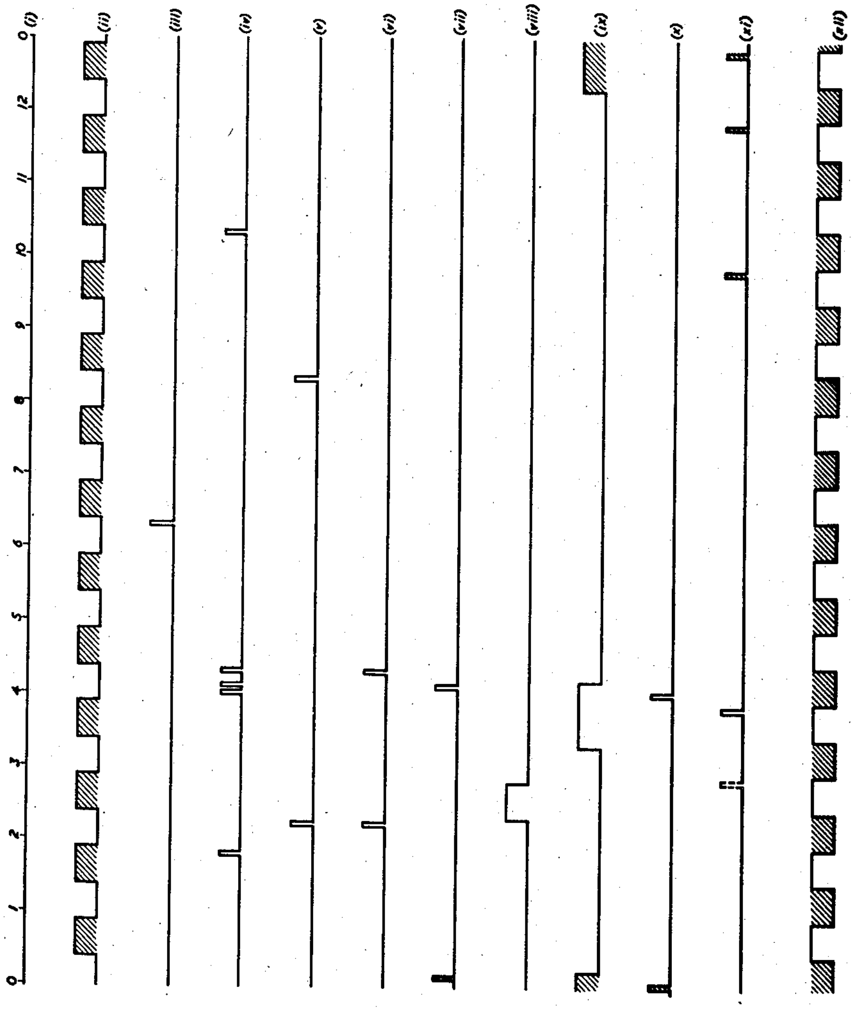
Figure 12E:
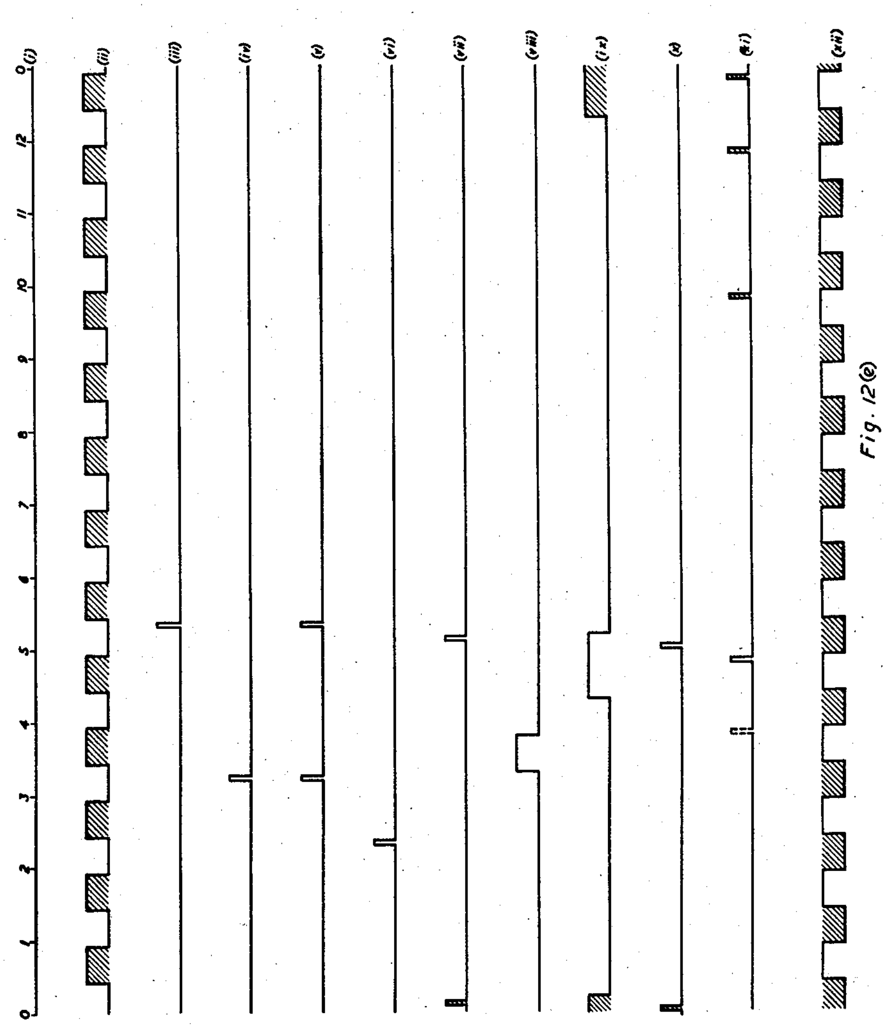

An embodiment of the present invention will now be described, by way of example, with reference to a specifical electrical computing engine, reference will now be made to the accompanying drawings, in which:

Figures 1(*a*), (*b*) and (*c*) are diagrams explanatory of the notation used in other figures for one of the circuit elements in logical circuits, Figures 2(*a*) and (*b*) are diagrams explanatory of the notation used in other figures for another of the circuit elements in the logical circuits, Figure 3 is a logical circuit diagram of a recorder for recoding a four-element code representing a decimal digit into a five-element code representing the same digit, Figure 4 is a circuit diagram of part of the arithmetical register of the computing engine, Figure 5 is a circuit diagram of part of a control ring in the computing engine, Figure 6 is a block-schematic diagram of part of the computing engine, Figure 7 is a logical circuit diagram of a recorder for recoding decimal digits stored in the accumulator of the computing engine into a four-element code, Figure 8 is a graphical representation of voltage against time and is explanatory of the circuit shown in Figure 7, Figure 9 is a logical circuit diagram of a ring accumulator, Figure 10 is a logical circuit diagram of one stage of the accumulator shown in Figure 9 and also includes a logical representation of part of one stage of the arithmetical register, Figure 11 is a circuit diagram of part of the accumulator stage shown in Figure 10.

Figure 13:
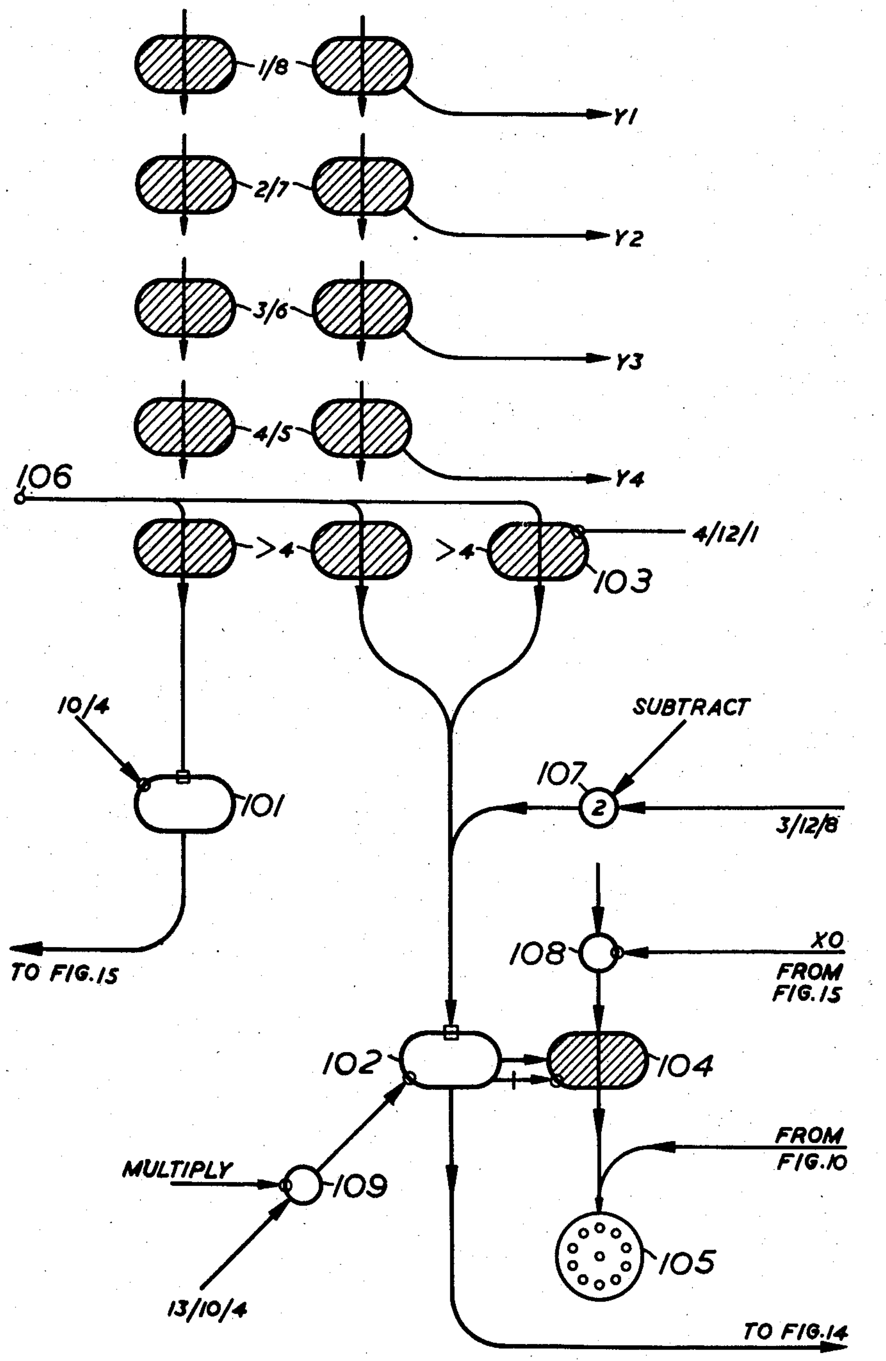
Figure 14:
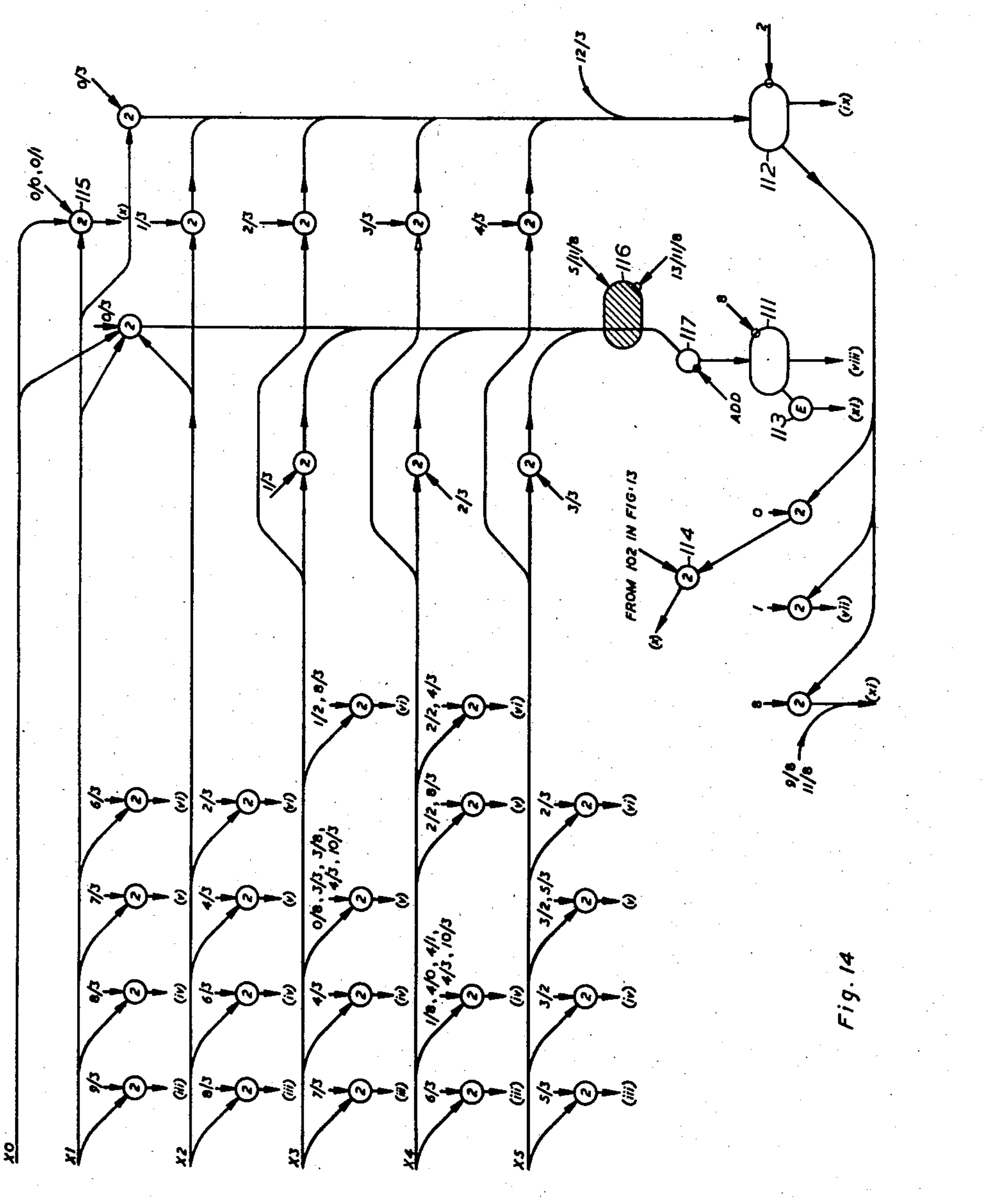
Figure 15:
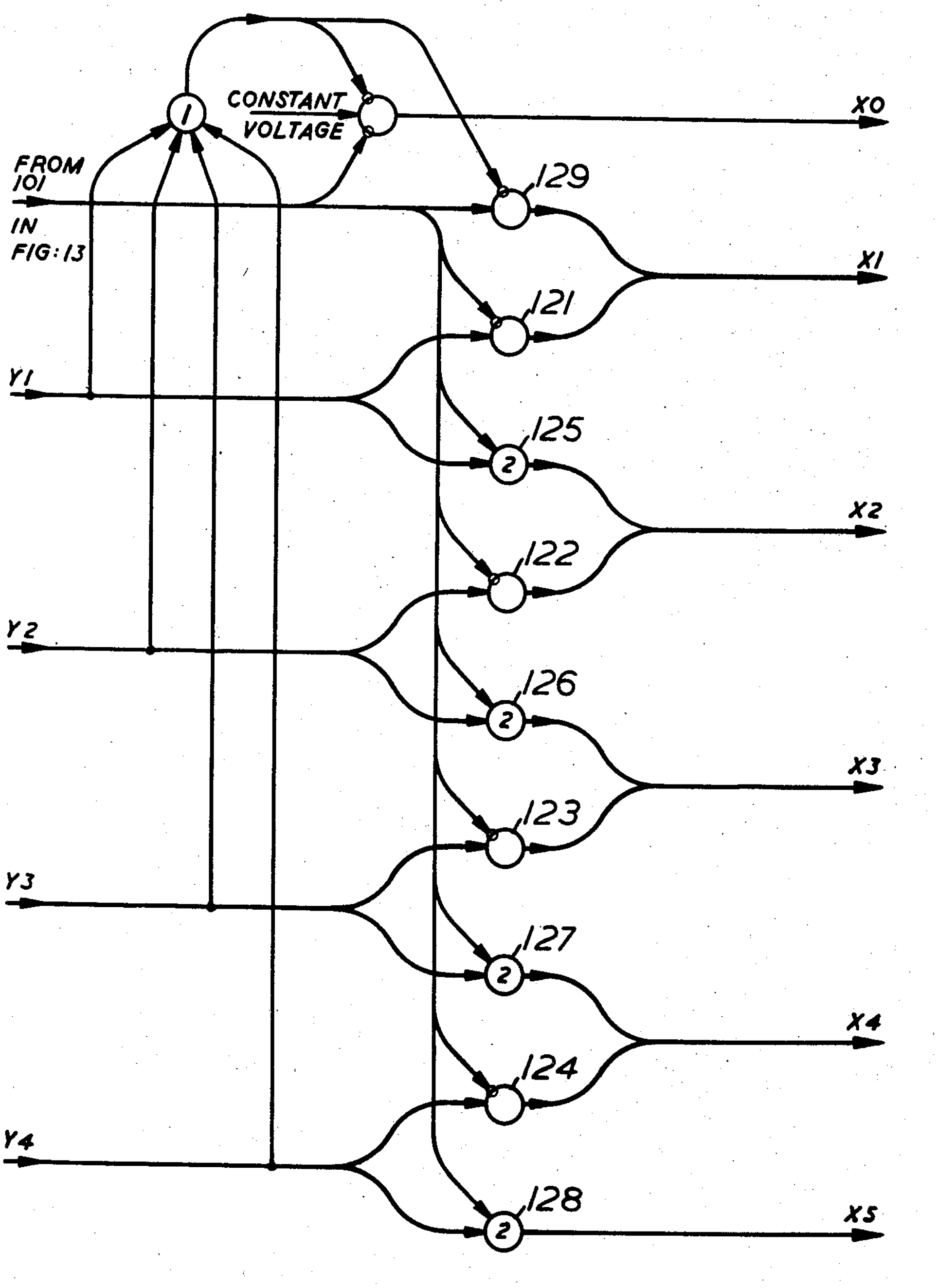
Figure 16:
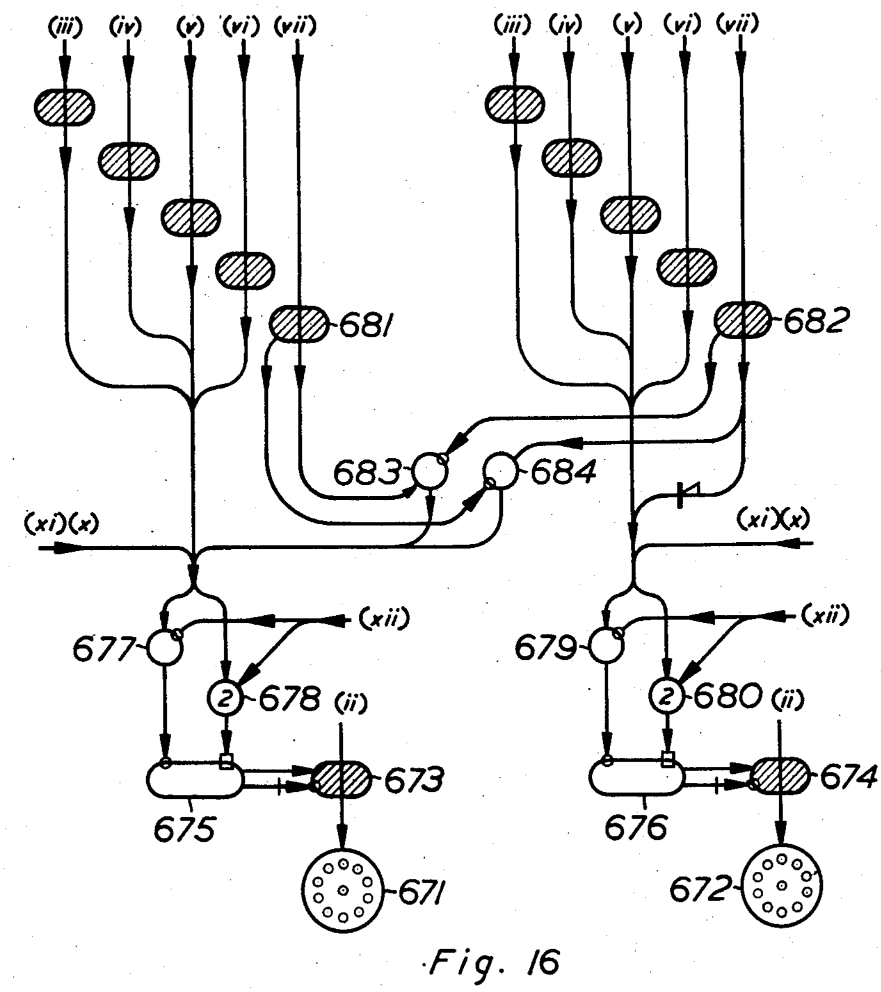
Figure 17:
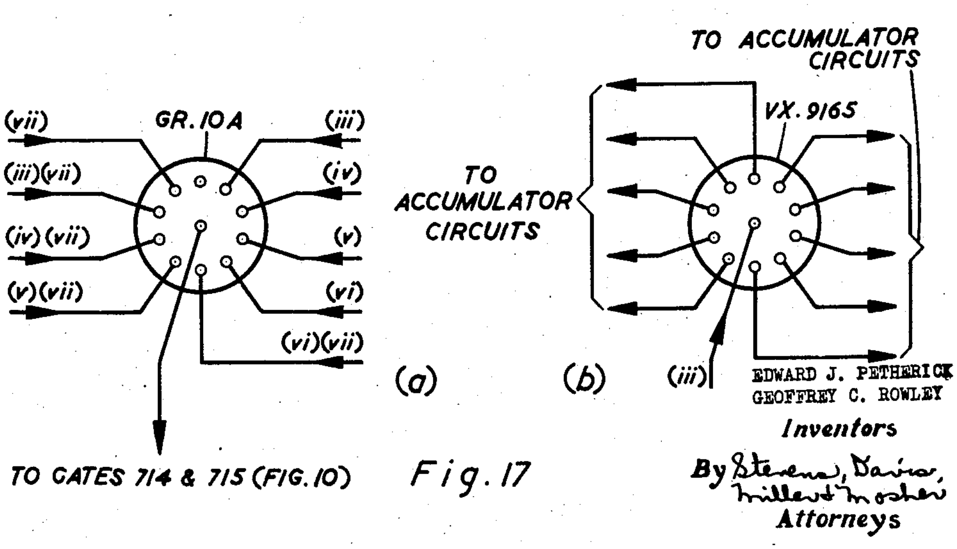
Figure 18:
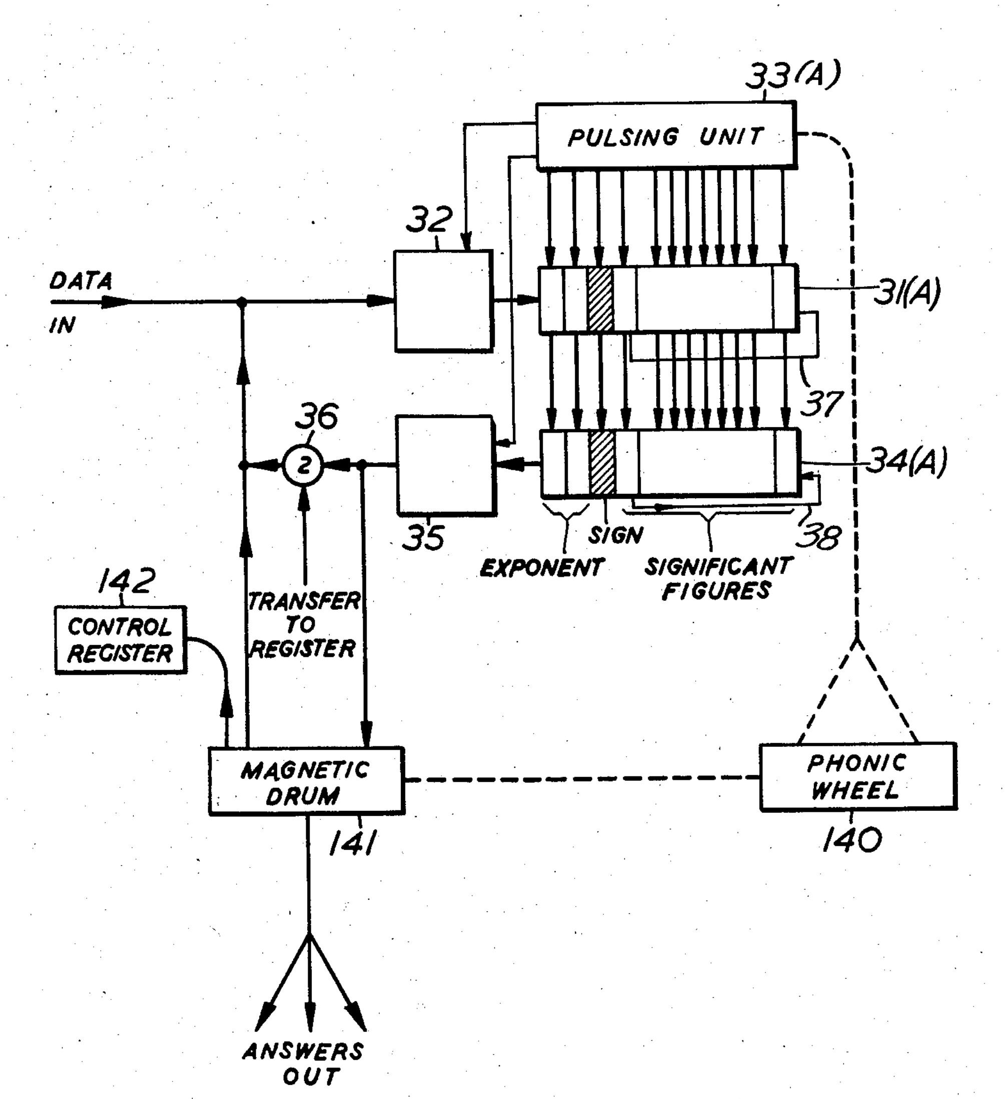

Figures 12 (*a*), (*b*), (*c*), (*d*) and (*e*) comprise a series of diagrams illustrating the timing of pulses applied to the arithmetical register, and other parts of the engine, during multiplication, Figure 13 is a logical circuit diagram of a multiplier register, a sign register and their associated circuits, Figure 14 is a logical circuit diagram of part of the pulsing unit indicated in Figure 6, Figure 15 is a logical diagram of a circuit for controlling the pulsing unit shown in Figure 14, Figure 16 is a logical circuit diagram of an exponent register and its associated scale-of-ten counters, Figures 17(*a*) and (*b*) are logical circuit diagrams illustrating two alternative forms of arithmetical register, and Figure 18 is a block-schematic diagram illustrating the general arrangement of the computing engine.

Some of the circuit elements illustrated in the accompanying drawings are described in the specification of United States Patent No. 2,686,632, issued August 17, 1954. As far as possible the notation defined in that specification will be used for the logical circuit diagrams in the present specification.

However, two of the circuit elements illustrated in the accompanying drawings have no counterpart described in the above-mentioned patent specification and will now be described with reference to Figures 1 and 2.

Figures 1(*b*) and (*c*) show the notation which will be used hereinafter to illustrate a circuit which will be termed hereinafter in the specification and appended claims as a trigger tube. The circuit employs a cold-cathode trigger tube in which a low current discharge between a subsidiary anode and cathode can be switched to a main anode-cathode path by a pulse applied to a transfer electrode. We use the tube sold under the trade designation G1/370K or G1/371K. The properties of this tube and its application are disclosed in a paper "Some recently developed cold cathode tubes and associated circuit" which was published in the April, May and June 1952 issues of Electronic Engineering, at pages 152, 230 and 272, respectively. One useful property of these tubes is that once the discharge has been transferred to the main cathode-anode path a tube may be used to pass applied pulses. The tube may therefore act as a combined trigger and gate.

Figures 1(*b*) and (*c*) illustrate the schematic notation used by comparison with a simple equivalent circuit using more conventional symbols as shown in Figure 1(*a*). Figure 1(*a*) shows a trigger tube 301 having an anode load 302 and a cathode load 303. A positive pulse applied to the trigger electrode of the trigger tube via input 1 will flash the trigger tube provided its anode-to-cathode voltage is sufficiently great. The flashing of the trigger tube causes a change in the direct voltage at output 1. When the trigger tube is flashed, a negative pulse applied to input 2 will appear as a negative pulse at output 2. A long negative pulse (of about 25 microseconds duration) applied to the input designated "put off 1" will put the trigger tube off (that is to say, cause the main cathode-anode discharge to cease) and also cause a negative pulse output at output 3. Those inputs and outputs are those generally used. However, other similar connections may be used. For example, a long positive pulse applied to the cathode of the trigger tube will put it off and a positive pulse may also be passed from the anode circuit to the cathode circuit.

Figures 1(*b*) and (*c*) show the schematic equivalents of Figure 1(*a*). The line drawn through the cross-hatched portion of the oval 304, from say, input 2 to output 2 illustrates the main cathode-anode path through which pulses may be passed. In Figure 1(*b*), the input 1 illustrates the connection to the trigger electrode to put the trigger tube on. Output 1 illustrates a direct voltage output from the trigger tube circuit and the "put off" connection illustrates a means of putting off the trigger tube. A line connected to the "put off" connection and to the main cathode-anode path, as shown in Figure 1(*c*) indicated that the pulse used to put the trigger tube off also serves to provide an output pulse at output 3.

This computing engine also employs scale-of-ten counters and we prefer to use a cold-cathode counting tube. These tubes are well-known in the art and are sold under the trade names "Dekatron" and "Nomotron." These tubes are generally called dekatrons. In these tubes a discharge is set up between a central anode and one of ten surrounding cathodes. This discharge can be stepped to successive cathodes by feeding pulses to certain transfer electrodes. Nine of the cathodes are usually connected internally and access is given to that group and to the remaining cathode. This remaining cathode forms the output electrode and gives an output while the discharge remains on it. The tube thus counts stepping or counting pulses down by a scale of ten. We prefer to use the tube sold under the trade designation GC.10D.

Figures 2(*a*) and (*b*) illustrate the convention used to represent dekatrons in the logical circuit diagrams in this specification. Figure 2(*a*) shows a dekatron 305 and an input for counting on stepping pulses connecting to the stepping electrode of the dekatron. A counting pulse applied to the input causes the discharge in the dekatron to be stepped from one cathode to the next. The nine cathodes which have a common connection are represented at 306. When the discharge reaches the output cathode 307 an output is obtained from the output cathode.

Figure 2(*b*) shows the convention actually used in the logical circuit diagrams in this specification. Figure 2(*b*) shows diagrammatically an envelope 308, a central anode and ten surrounding cathodes. The input connected to the envelope is equivalent to the input for counting pulses shown in Figure 2(*a*) and the output is shown connected to a cathode (the output cathode).

In Figures 17(*a*) and 17(*b*) of the drawings, switching tubes are illustrated. In these cases, inputs or outputs may be applied to or taken from any of the cathodes and connections to all the cathodes are thus shown. Similarly an input or an output may be applied to or taken from the anode and a connection to the anode is, therefore, shown. The discharges in these switching tubes may also be stepped in a manner similar to the manner illustrated in Figure 2(*a*).

The engine to be described works in the decimal scale of notation and digits of numbers are represented by pulses or spaces (that is to say, the absence of pulses) and since the digits 0–9 may occur in decimal arithmetic, it follows that at least four two-state code elements are required to represent the possible decimal digits. In the present engine the decimal digits are represented by a four-element code in the main storage of the machine but in the arithmetical register they are represented by a five-element code.

In the store, numbers are presented in the serial mode, and the code elements to each digit are presented simultaneously, that is to say, on four channels simultaneously. When the four-element code is used, the channels will be referred to as the channels 1, 2, 3 and 9, and when the five-element code is used, the channels will be referred to as 1/8, 2/7, 3/6, 4/5 and >4. The codes used are represented in the following table:

*Table 1*

| Four-element code for storage — Channels used | | | | Digit | Five-element code for the Arithmetical Register — Channels used | | | | |
|---|---|---|---|---|---|---|---|---|---|
| 1 | 2 | 3 | 9 | | 1/8 | 2/7 | 3/6 | 4/5 | >4 |
| x | x | ----- | ----- | 0 | ----- | ----- | ----- | ----- | ----- |
| x | ----- | ----- | ----- | 1 | x | ----- | ----- | ----- | ----- |
| ----- | x | ----- | ----- | 2 | ----- | x | ----- | ----- | ----- |
| ----- | ----- | x | ----- | 3 | ----- | ----- | x | ----- | ----- |
| x | ----- | x | ----- | 4 | ----- | ----- | ----- | x | ----- |
| ----- | x | x | ----- | 5 | ----- | ----- | ----- | x | x |
| ----- | ----- | x | x | 6 | ----- | ----- | x | ----- | x |
| ----- | x | ----- | x | 7 | ----- | x | ----- | ----- | x |
| x | ----- | ----- | x | 8 | x | ----- | ----- | ----- | x |
| ----- | ----- | ----- | x | 9 | ----- | ----- | ----- | ----- | x |

In this table an *x* indicates that a pulse, or a voltage, is present on the channel indicated.

The use of the five-element code set out in Table 1 renders it a simple matter to take either the direct digit of an operand or its complement on 9.

At this stage it will be convenient to explain how the four-element code used in the store of the engine is translated into the five-element code used in the arithmetical register, and for this purpose reference is made to Figure 3. The four-element codes appear on the channels marked 1, 2, 3 and 9 at the left-hand side of the drawing and are translated to a five-element code on the channels 1/8, 2/7, 3/6, 4/5 and >4 at the right-hand side of the drawing. The voltages on these last channels may be set up by trigger tubes 11, 12, 13, 14 and 15. The tubes 11, 12 and 13 are set respectively by the channels 1, 2 and 3 through the gates 16, 17 and 18, provided these gates are not inhibited. These gates are, however, inhibited when a voltage occurs simultaneously on any two of the channels 1, 2 and 3. The gates are, of course, inhibited by the output from the end gate 19 when the condition stated exists. The tube 14 is flashed when there is a voltage on the lines 1 and 3 or 2 and 3, because the output from the gate 19 will gate the voltage on the line 3 through the gate 111 to the tube 14. Finally the tube 15 will be operated when there is a voltage present on the channels 2 and 3 or on the channel 9; gate 112, of course, passes the voltages on the lines 2 and 3 to operate the tube 15. It will thus be seen that the codes are translated in accordance with Table 1.

The states of the trigger tubes 11 to 15 may be read by applying a voltage pulse to an input line 113 in a manner to be explained hereinafter. The voltage pulse passes through those (if any) of the trigger tubes 11 to 15 which are flashed so that a pulse appears on none, one or two of the output channels 1/8, 2/7, 3/6, 4/5 and >4 so as to represent one of the decimal digits 0 to 9 in the five-element code. The voltage pulse is also applied to an end element 114 the output of which is connected to an inhibiting connection on each of the trigger tubes 11 to 15. Thus, at the end of each voltage pulse those trigger tubes which have been flashed are put off.

The gate 19 is arranged to give an output when it receives an input on any two of the input lines. This gate may conveniently comprise three resistances fed separately with the input voltages and all connected at their ends remote from the input ends to a common resistance. This common resistance may be arranged between the control grid and cathode of a thermionic valve. The bias on the valve may be such that when current flows through the common resistance simultaneously from two input sources, sufficient voltage is developed across the common resistance to switch the valve on (or off) and so to yield an output voltage at the anode of the valve.

The trigger tubes 11–15 may, of course, be replaced by any known trigger if it is so desired.

In this engine, numbers are presented in the form $\pm|p|\times 10^j$ where $|p|$ is less than unity and $-19\leq j\leq 29$.

The exponent digits are coded, in all parts of the engine except the accumulator, in the following manner. Positive exponents are coded as they are. The tens digit of a negative exponent is coded as its complement on 9 and the units digit of a negative exponent is coded as it is. Thus an exponent of 27 is coded as 27 and an exponent −17 is coded as 87.

The sign of the number is coded as 0 for positive and 9 for negative. Numbers are presented from the input readers and from the store, digit by digit in the following order:

First the tens digit of the exponent; second the units digit of the exponent; third the sign of the number; fourth the most significant digit of the number; and then the other digits of the number in order of decreasing significance up to nine significant figures. This is a total of twelve digits. The digits are stored, in the four-element code, on groups of four tracks on a magnetic drum in the following way:

Each group of four tracks stores 100 numbers with their signs and two-digit exponents. The drum is divided into fourteen sectors which will be referred to hereinafter as sectors 0 to 13. The tens digits of the exponents of the numbers are all stored in the sector 1, followed by the units digits of the exponents in the next sector and so on until the 9th significant figure of all numbers is stored in the sector 12. Sectors 0 and 13 are not used for storing numbers. The digits stored in sectors 1 to 12 are stored in the first $\frac{10}{13}$ of each sector to pass the reading heads. The remaining $\frac{3}{13}$ are not used for storing digits.

With a circumferential packing of 75 digits to the inch, the diameter of the drum is eight inches and its speed, which depends on the speed of working of the dekatrons, is about 6,600 revs. per minute. A series of phonic wheels are mounted on the axle of the drum and are arranged to give certain control impulses which will be hereinafter more specifically defined.

The phonic wheels also serve to define the location of the digits of a number stored on the magnetic drum. The wheels define the sectors on the drum. The sectors are sub-divided into thirteen sub-sectors, which will be referred to hereinafter as sub-sectors 0 to 12. The digits of numbers are stored in sub-sectors 0 to 9. The sub-sectors are sub-divided into ten divisions, which will be referred to hereinafter as divisions 0 to 9. The exponent, sign and significant figures of a single number are stored around the drum in the same sub-sector and division location in each of the sectors 1 to 12 around the drum. The digits of a number are read from the drum under the control of gating circuits opened by pulses from the phonic wheels defining the sub-sectors and divisions in which they are located.

The phonic wheels basically comprise seventeen Phosphor-bronze cylinders driven in synchronism with the magnetic drum. These cylinders each have lines etched into them and these lines are filled with magnetic material so that magnetic heads placed near the periphery of the cylinder will yield pulses as the lines pass the heads. The seventeen phonic wheels define each digit storage location round the drum in a two-out-of-six code resembling the 1, 2, 3, 9 code. This code is given in Table 2, the ticks indicating the code elements or channels which represent each particular decimal number corresponding to a sector, sub-sector, or division:

*Table 2*

| Channels used in 2-out-of-6-code on the phonic wheel | | | | | | Digit |
|---|---|---|---|---|---|---|
| Y | X | 1 | 2 | 3 | 9 | |
| -- | -- | √ | √ | -- | -- | 0 |
| -- | √ | √ | -- | -- | -- | 1 |
| -- | √ | -- | √ | -- | -- | 2 |
| -- | √ | -- | -- | √ | -- | 3 |
| -- | -- | √ | -- | √ | -- | 4 |
| -- | -- | -- | √ | √ | -- | 5 |
| -- | -- | -- | -- | √ | √ | 6 |
| -- | -- | -- | √ | -- | √ | 7 |
| -- | -- | √ | -- | -- | √ | 8 |
| -- | √ | -- | -- | -- | √ | 9 |
| √ | √ | -- | -- | -- | -- | 10 |
| √ | -- | √ | -- | -- | -- | 11 |
| √ | -- | -- | √ | -- | -- | 12 |
| √ | -- | -- | -- | √ | -- | 13 |

Six channels define which sector, a further six which sub-sector and five more channels which division within a sub-sector is passing the reading heads at any instant. Each cylinder is divided notionally round its edge into 1820 equal divisions. Some divisions are then left blank and others are etched and filled with magnetic material in accordance with the six channel code of Table 2. This arrangement enables appropriate digits to be read from the drum when required, at times defined by coincidence between the outputs from the sub-sector and digit channels of the wheel and corresponding channels specifying the third and fourth digits of the address of the required number. Further coincidence circuits examining the output from the wheel provide pulses, at intervals of five micro-seconds, for controlling the machine during each drum turn.

The phonic wheels may be reduced in number to eleven by replacing the phonic wheels defining the sectors by a counter counting, say, the 0th or the 12th sub-sectors as they pass the magnetic reading heads.

The phonic wheels may, alternatively, comprise a series of iron wheels, having lines engraved on them at the requisite points to give, in conjunction with magnetic reading heads, control pulses at the apropriate times. As a further alternative the phonic wheels may comprise a transparent wheel or cylinder having opaque lines marked on it at appropriate places and this form of phonic wheel may co-operate with a light source, a slit-aperture and a light sensitive cell to yield the necessary pulses. The markings on this form of phonic wheel may be produced photographically. Alternatively, instead of opaque lines marked on a transparent wheel or cylinder the markings may be photographed negatively, leaving transparent lines on an opaque wheel or cylinder.

In another modification; the phonic wheels may take the form of a magnetic drum having the desired impulses recorded on it at the appropriate places.

In yet another modification; the phonic wheel may comprise a disc of copper, say, etched optically with rings of radial lines. These lines are filled with ferro-magnetic material and operate in conjunction with magnetic reading heads to yield pulses in accordance with the code of Table 2. In this manner, the sub-sectors and divisions at least may be defined, a counter being used if necessary to define the sectors.

Suitable gating circuits and flip-flop circuits are used to give the control pulses used in the engine and described hereinafter.

The numbers to be operated on are recorded on a main shifting register in the arithmetical organ. As already stated numbers are in the five-element code and each significant figure of the number is recorded on a quintet of trigger tubes in one stage of the register. None, one or two of the trigger tubes in each quintet will be flashed in accordance with the code in Table 1. The shifting register we use is known and is similar to that described in detail in the May 1952 issue of Electronic Engineering on page 231. The register is a shifting register, that is to say, a given pattern of settings representing a given number may be shifted one place in the direction of decreasing significance by the application of a shifting pulse via valves which control the register. Part of the register is shown in Figure 4. This figure shows three cold-cathode trigger tubes which represent, say, the three least significant digits at the 1/8 level of the register. The circuit will be extended to the left of the drawing to cover the whole nine significant figures that the register will accommodate and will be repeated four times as indicated by the dotted rectangles in the 2/7, 3/6, 4/5 and >4 channels.

Two control valves 21 and 22 are used for shifting the register and for setting and inspecting the register respectively. The control valve 21 is normally conducting. To shift the contents of the register, a negative pulse of 25 microseconds duration is applied to the control grid of the valve 21 to cut the valve off. The pattern of conduction of the cold-cathode trigger tubes then moves one place to the right in the drawing (that is to say, one place in the direction of decreasing significance). It will be appreciated that valves similar to the valves 21 and 22 are associated with the cold-cathode trigger tubes in the other channels (the 2/7, 3/6, 4/5, and >4 channels) and that shift and setting pulses are applied to these other valves at the same time as they are applied to the valves 21 and 22.

The circuits are connected in a ring so that a digit set up on one quintet of cold-cathode trigger tubes may be shifted completely round the ring. Normally, for example during the process of multiplication, shift to the most significant quintet of cold-cathode trigger tubes from the least significant quintet of cold-cathode trigger tubes is inhibited. This effect is obtained by means of triode valves, such as the valve 23, each of the control grids of which is connected to a potentiometer, one end of which is connected to a separate stage of a control ring (to be described hereinafter) and the other end of which is connected to a bias of $-x$ volts. When it is desired to inhibit the shift, the bias $-x$ is made equal to $-70$ volts so that when the corresponding stage of the control ring is active (to indicate the most significant quintet of the register) the triode valve is made conducting. The trigger electrodes of the cold-cathode trigger tubes in the quintet thus defined as the most significant stage of the register are thus held at such a low voltage that shift cannot occur at this point.

The register is set up as follows. One quintet of cold-cathode trigger tubes at a time is set up in the five-element code of Table 1 in accordance with a digit of an operand. The bias of $-x$ is made equal to $-150$ volts so that no triode valve, such as the valve 23 is conducting and no trigger electrodes are held at a low voltage. A high voltage bias is applied to the trigger electrode of the cold-cathode trigger tube or to the trigger electrodes of the two cold-cathode trigger tubes required to be flashed in accordance with the code and a positive pulse of 25 microseconds duration is applied to the valves, such as the valve 22. These valves are normally cut off but are caused to conduct by the positive pulse applied thereto. In this manner the cold-cathode trigger tube or cold-cathode trigger tubes to which the high positive bias is applied are flashed. The bias potential referred to is derived from the recoder shown in Figure 3 through the control ring circuit. The control ring circuit essentially comprises a series of cold-cathode trigger tubes arranged as in the shifting register. Only one cold-cathode trigger tube is flashed to provide a path for the high positive bias and the state of conduction is stepped as described above in connection with the register. After the arithmetical register has been set up in accordance with all the significant figures of an operand, the control ring may be stepped further so as to define the most significant stage of the arithmetical register (that is to say, the stage holding the most significant digit of the operand) by inhibiting any shift from the least significant stage of the register to the most significant stage thereof in the manner above-described.

Three stages of the ring circuit are shown in Figure 5, only one of the cold-cathode trigger tubes is flashed at a time. The application of a positive pulse at the stepping input at the top left-hand side of the drawing steps on the state of conduction from one cold-cathode trigger tube to the cold-cathode trigger tube at its right in the drawing. The circuit works as follows: Suppose the extreme left-hand trigger tube A1 in Figure 5 is conducting, then its main cathode will be nearly at H.T. positive, say about 300 volts. When a positive trigger pulse is applied to the trigger electrodes of all the trigger tubes via the stepping input, the main cathode-anode path of the cold-cathode trigger tube A2 will conduct because the trigger electrode of the cold-cathode trigger tube A2 will be at a high positive voltage which is caused by the combined effect of the trigger pulse and the main cathode voltage of the cold-cathode trigger tube A1. The conduction of the cold-cathode trigger tube A2 will, however, cause a drop in potential of the main anodes of the trigger tubes. This drop in potential will, in conjunction with the high potential on the cathode of the cold-cathode trigger tube A1, be sufficient to cause the discharge in the cold-cathode trigger tube A1 to pass to the auxiliary cathode-anode path of that tube. However, the charge on the condenser in the main cathode-earth path of the trigger tube A1 will be retained for a length of sufficient time to maintain the trigger electrode of the trigger tube A2 at a sufficiently high positive voltage to maintain the main cathode-anode path of the trigger tube A2 conducting.

The rectifiers such as A4 connected across the trigger load resistors such as A5 is a novel feature of the circuit and enables a high stepping rate to be obtained.

It is to the cathode of one of the trigger tubes of the control ring that the potentiometer in the control grid circuit of the triode valve 23 is connected. The number of stages in this control ring are equal to the number of stages in the shifting register and each valve, similar to the valve 23 in the shifting register, is connected to the cathode of a trigger tube in a corresponding position in the control ring. Thus, for example, the grid of the valve 23 (Figure 4) may be connected to the cathode of the trigger tube A1 (Figure 5) via a line 24, the grid of the valve 25 (Figure 4) may be connected to the cathode of the trigger tube A2 (Figure 5) via a line 26 and so on progressively round the rings.

The register is associated with an accumulator and also with a pulsing unit as in the circuit arrangement shown in Figure 6. In this drawing, 31 is the main shifting register which is fed with five-element codes from a recoder 32, which is fed with four-element codes from the store or input of the engine, as already above described, with reference to Figure 3 of the drawings. The register controls pulses from a pulsing unit 33 and applies them (in a manner to be particularly described hereinafter) to an accumulator 34. The pulses from the pulsing unit 33 are initially applied, at times to be described hereinafter, to the control valves, such as the valves 22, of the register. These pulses are of 2½ microseconds duration and are positive so that the control valves are rendered conducting for short intervals of time. In this manner, short negative pulses are passed through those of the trigger tubes in the register which are flashed.

The accumulator 34 comprises a ring of dekatrons with a special circuit for carrying, which will be more particularly explained hereinafter. The accumulator will record digits in pure decimal form and these will be recoded in the four-element code in the recoder 35 and then stored or, in certain cases, transferred back to the register via the gate 36 and the recoder 32.

The method of operation of the recoder 35 will be described with reference to Figures 7 and 8. In Figure 7 there are shown trigger tubes 41, 42, 43 and 44 associated with the channels 1, 2, 3 and 9 respectively. These tubes are first connected to the output cathode of the dekatron chosen as the most significant in the accumulator. At a given time, pulses derived from the phonic wheel on the axle of the magnetic drum are applied to this dekatron and at the same time biassing potentials, also derived from the phonic wheel via the pulsing unit, are applied to the trigger tubes 41—44 at pulse times selected in accordance with Table 3 set forth below. When the number residing in the accumulator is positive, the biases are applied at pulse times represented by the numeral "1" in the table and when the number in the accumulator is negative, the biasses are applied at pulse times represented by crosses $x$ in the table.

*Table 3*

| | Dekatron reaches output cathode after pulse | | | | | | | | | |
|---|---|---|---|---|---|---|---|---|---|---|
| | 1 | 2 | 3 | 4 | 5 | 6 | 7 | 8 | 9 | 10 |
| Bias to tube: | | | | | | | | | | |
| 41 | 1$x$ | ---- | ---- | $x$ | 1 | ---- | ---- | 1$x$ | 1 | $x$ |
| 42 | ---- | 1$x$ | ---- | 1 | $x$ | ---- | 1$x$ | ---- | 1 | $x$ |
| 43 | ---- | ---- | 1$x$ | 1$x$ | 1$x$ | 1$x$ | ---- | ---- | ---- | ---- |
| 44 | 1 | 1 | 1 | ---- | ---- | $x$ | $x$ | $x$ | $x$ | 1 |
| Cathode of dekatron on which discharge stood before pulsing | 8 | 7 | 6 | 5 | 4 | 3 | 2 | 1 | 0 | 9 |

When the discharge in the dekatron reaches its ninth cathode, an output pulse is derived therefrom in a manner to be described hereinafter with reference to Figure 10. This output pulse is applied to the trigger tubes 41 to 44 (via the input line 425) and the one or two of these trigger tubes, biassed at that time is/are flashed and so yield(s) the appropriate code on 1, 2, 3 and 9 channels. This will be made clear if a particular example is considered. Suppose that the dekatron records the positive digit 6, it will give an output on the third applied pulse and therefore sets the tubes on the channels 3—9 (see Table 1).

The dekatrons are tested in turn in the manner to be described hereinafter with reference to Figure 10. Before the next dekatron is tested, the trigger tubes 41—44 are cleared by pulses derived from the phonic wheel via the pulsing unit, and as they are cleared they set a corresponding group of trigger tubes 411, 412, 413 and 414 through the end elements 421, 422, 423 and 424. While the next dekatron is being examined, the digit recorded on the triggers 411–414 is written into the store, or passed again to the register through the recoder 32 if necessary. The successive inspection of the dekatrons is done by the same ring circuit that is used to set the register.

Figure 8 shows diagrammatically the wave forms of the potentials used in testing the dekatrons. In this drawings, 51 represents the digit pulses applied to the dekatron and 52 represents a voltage derived from the dekatron when the discharge reaches the ninth (output) cathode, and at 53 there is shown the form of the bias potentials applied to a particular one or pair of the trigger tubes 41—44 to render them capable of being flashed by the potential shown at 52. The biassing potential 53 is, of course, derived from the phonic wheels associated with the magnetic storage drum via the pulsing unit. The output voltage 52 from the dekatron and the biassing potential, such as that shown at 53, are arranged to have such amplitudes that individually they do not increase the potential difference between the cathode and the trigger electrode to a point at which the trigger tube becomes flashed (that is to say, individually they do not increase this potential difference to a value greater than about 164 volts) but that together they increase this potential difference to a value at which the trigger tube is flashed (that is to say, together they increase this potential difference to a value greater than about 191 volts).

The accumulator will now be described. This comprises nine stages comprising nine dekatrons, 61–69, connected in a ring as shown in Figure 9. The accumulator is a parallel counting accumulator and counting pulses may be applied to all the dekatrons simultaneously. When the discharge leaves the ninth (output) cathode of a given dekatron it will supply a pulse which may be applied to the stepping electrode of the dekatron of next higher significance. This pulse, however, is not applied directly to the dekatron of next higher significance but is stored in a control circuit such as 611 (to be described hereinafter with reference more especially to the components 711, 712 and 719 shown in Figure 10) and is used to allow a carry pulse to pass to the dekatron of next higher significance at certain specified times. This is necessary because a counting pulse might be applied to one dekatron when its next less significant neighbour is yielding a carry pulse. The exact time at which carry pulses are passed on will be specified later. The accumulator is connected in a complete ring so that the dekatron chosen as the most significant dekatron can pass carry digits to the input of the dekatron of least significance.

Details of one stage of the accumulator are shown in Figure 10. This drawing also shows at the top of the drawing the corresponding quintet of trigger tubes 74–78 in the register and inhibiting gates 271, 272, 273, 274 and 275 for inhibiting, under the control of the trigger tube flashed in the control ring, shift from the least significant stage of the register to the most significant stage of the register (as defined by the control ring). These inhibiting gates illustrate diagrammatically the action of a triode valve, such as the valve 23 in Figure 4. The dekatron is shown at 71 and is fed with stepping or counting pulses via a trigger tube gate 72. The trigger tube 72 is controlled by a hard-valve trigger 73 in such a way that when the trigger 73 goes on the trigger tube 72 is put on, and when the trigger 73 goes off the trigger tube 72 is put off. It will be remembered that trigger tubes such as 72 also act as gates because when they are flashed the main anode cathode path may be used to pass an applied pulse. Another property of these trigger tubes should be mentioned here. If a tube is put off and a pulse is applied to it at the same time or very soon after, this pulse will pass through the tube. This effect is due to the finite de-ionisation time of the tube. This property of the tube may be employed in another way, in that a long negative pulse applied to the anode of the tube acting as a gate will also put it off. In this case the pulse will pass through the tube and at the same time put the tube off.

The trigger 73 has two inputs, one a resetting input fed with pulses from the register via the gate 714. A pulse on this input puts the trigger off (or tries to put it off if it is already off). The other input is a changeover input fed with pulses from the register via the gate 715. Pulses at this input change the state of the trigger. The gates 714 and 715 are controlled in a complementary manner, as shown.

When the discharge in the dekatron 71 reaches its ninth cathode it gives an output which is amplified by the amplifier 79. When the discharge leaves the ninth cathode this output terminates and an end element 711 puts the trigger tube 712 on. This trigger tube 712 is the carry-memory trigger and passes carry pulses applied to it when it is flashed. These carry pulses pass to the stage of next higher significance via the line 721 and also put the tube 712 off as indicated. A carry pulse is applied to a line and beginning element, such as those shown at 722 and 718, in the stage holding the digit of next higher significance. The trigger, such as 73, has already been put off, in a manner to be described later, so that it is then put on for sufficient time to allow one counting pulse to reach the dekatron similar to the dekatron 71 in the stage.

When the dekatrons such as 71 are inspected to clear the contents of the accumulator and to set up the recoder described with reference to Figures 7 and 8, the trigger 73 is put on by means of a pulse applied through a gate 276 at a time when the gate 715 is open. The gate 276 is opened under the control of the control ring which determines the order in which the dekatrons are cleared. Stepping pulses are thus applied to the dekatron via the gate 72. During this process the gate 716 is open. Consequently when the discharge reaches the ninth cathode of the dekatron 71 a pulse from the beginning element 717 puts the trigger 73 off. This gives an output from the beginning element 717 which goes to the recoder to set the triggers in the manner described with reference to Figure 7. Each dekatron is inspected in turn, from that holding the most significant digit to that holding the least significant digit, under the control of the control ring. Initiation of clearance pulses are applied to the gates, such as the gate 276, at or near the beginning of each sector of the phonic wheel while clearance of the accumulator is taking place. The discharge on the control ring is stepped on one stage after each dekatron has been inspected so that the gates, such as the gate 276, are opened in turn until all the dekatrons have been inspected.

At the times at which carry pulses, if any, are to be transferred to the next significant stage it may happen that the dekatron 71 is discharging on its ninth cathode when a carry arrives from the next less significant stage via the line 722. (In a case of this sort it may easily be seen that the trigger tube 712 cannot have a carry stored in it.) Before a carry pulse arrives the hard trigger 73 is put off, in a manner to be described later, consequently the carry pulse will put the trigger 73 on through the beginning element 718 and at the same time will pass via the gate 719 to the stage of next higher significance. Consequently the next stepping pulse will pass via the gate 72 to switch the discharge in the dekatron 71 to the tenth cathode. At the end of the carry pulse the trigger 73 is put off again in a manner to be described later. When the discharge leaves the ninth cathode to pass to the tenth cathode of the dekatron 71, the trigger 712 will be flashed by a pulse from the end element 711. However, carry pulses are applied simultaneously to all the trigger tubes such as 712 which are put off by these carry pulses. Thus a through carry will be passed to the stage of next higher significance, the dekatron 71 will be left with its discharge on its 10th (0th) cathode and the trigger tube 712 will be cleared. Although carry has been described above as taking place from an accumulator stage to an accumulator stage holding a digit of next higher significance, a carry may also occur from the stage holding the most significant digit to the stage holding the least significant digit. This follows from the fact that the accumulator is connected in a closed ring as described with reference to Figure 9.

A gate 720 is controlled by the control ring circuit so that the gate is open when the stage holds the most significant digit in the accumulator. In this case, any carry pulse from or passing through the stage will pass to the gate 720 to step a dekatron holding the sign digit on to its next cathode. The reason for this will be explained hereinafter. Also any carry digit will pass to the least significant stage in the accumulator since the accumulator is a closed ring of nine dekatrons.

Details of the triggers 73, 72 and the gates 714 and 715 are shown in Figure 11. In this figure the trigger 73 comprises two triode valves connected in known manner as shown. The output from the trigger 73 controls the trigger-tube gate 72 as shown. The state of the trigger 73 is controlled by negative pulses applied to it at appropriate times to the inputs (iii), (iv), (v), (vi) and (vii) through the quintet of trigger tubes 74 to 78 say. The effect of these pulses depends upon the state of the gate circuit comprising the diodes 81 and 82 and the resistor R1. A controlling potential is applied as shown to the diode 81 and this potential is either 350 volts or 150 volts. If this control potential is 150 volts a negative controlling pulse is applied simultaneously to both grids of the trigger tube 73 and has the effect of changing the state of the trigger.

For example, suppose the right-hand side of the trigger is conducting. When the short negative pulse is applied to both grids neither side of the trigger conducts, consequently the anode potential on the right-hand side rises and charges the condenser 80 so that when the short negative pulse terminates the left-hand grid of the trigger 73 is at a relatively high potential and the state of conduction transfers to the left-hand side of thee trigger. A similar but opposite effect is produced by the next negative pulse applied simultaneously to both grids. On the other hand if the control potential applied to the diode 81 is 350 volts, the negative pulse is applied only to the left-hand grid of the trigger 73 and switches the discharge (or tries to switch the discharge) to the right-hand side of the trigger, that is to say, in the convention we are adopting, puts the trigger off. Thus, referring back to Figure 10, a potential of 350 volts on the gate corresponds to the gate 715 being closed and a potential of 150 volts corresponds to the gate 715 being open.

Before the method of multiplication can be explained, a few arithmetical principles must be considered. In the first place it will be appreciated that in decimal arithmetic, direct multiplication by a multiplier digit greater than 5 is not necessary because such a multiplication can be effected by increasing the digit of next higher significance in the multiplier by one and multiplying by minus the complement on 10 of the digit greater than 5. This will become clear if a simple example is considered:

To multiply a multiplicand B by 27, multiply by 30 and then by 3 and subtract the second product from the first. Thus: $27B=(30-3)B=30B-3B$. This rule may be codified as follows:

Inspect two consecutive digits of the multiplier at a time, and multiply by a multiplier factor, F, according to the following table:

*Table 4*

| More significant multiplier digit, N | | 0 | 1 | 2 | 3 | 4 | 5 | 6 | 7 | 8 | 9 |
|---|---|---|---|---|---|---|---|---|---|---|---|
| Multiplier factor, F, required if the less significant multiplier digit is: | <5 | 0 | 1 | 2 | 3 | 4 | −5 | −4 | −3 | −2 | −1 |
| | >4 | 1 | 2 | 3 | 4 | 5 | −4 | −3 | −2 | −1 | −0 |

In the engine as described hereinafter, the process starts at the most significant digit of the multiplier and this digit must be considered to be preceded by a zero. Similarly the last (i.e. least significant) digit must be considered to be followed by a zero. However, the process may start at the least significant digit of the multiplier (considered to be preceded by a zero) and end with the most significant digit (considered to be followed by a zero). The algebraic sum of all the multiples of a multiplicand and a multiplier factor make up the required product. At this point it may be explained that multiplication by a negative number is obtained by multiplying, in effect, the complement of the multiplicand by the same positive number and using round carry. This also will become clear if an example is considered.

Suppose the number 734106294 is in the accumulator, and suppose that a multiplicand 103709211 is to be multiplied by −3 and added algebraically to the number in the accumulator. The resultant number is obtained as follows:

```
                      734  106  294
−3 × Multiplicand−311  127  633
                      -------------
                      422  978  661
```

The same result may be obtained in the present engine in a manner somewhat similar to the following: The complement of the multiplicand 103, 709, 211 is 896, 290, 788 and +3 times this is 2, 688, 872, 364.

This is added to the accumulator as follows:

```
  : 734, 106, 294
2 : 688, 872, 364
  :
-----------------
  :
3 : 422, 978, 658
```

The 3 in the overspill position is carried over to the least significant place and gives 422, 978, 661, which is the required result.

It will be seen later that to take the complement of the multiplicand, it is merely necessary to counteract the effect of the trigger tubes in the >4 channels of the register which holds the multiplicand. This is a simple matter as will be seen when the process of multiplication has been described in detail.

The process of multiplication may now be described. The process starts by the multiplicand being set up on the register in one turn of the magnetic drum. In the next turn of the drum the digits of the multiplier are read out, inspected and multiplication by each multiplier factor (determined in accordance with Table 4) in turn is effected. For multiplication by each multiplier factor a train of 13 counting pulses is applied to all the dekatrons, such as 71 in Figure 10, through the gates, such as 72, which are controlled by the triggers, such as 73, in the manner specified in the following table:

*Table 5*

| Multiplier factor, F | | | 1 | 2 | 3 | 4 | 5 |
|---|---|---|---|---|---|---|---|
| Register's contents shift and any carry period occurs during pulse | | | 1 | 2 | 3 | 4 | 5 |
| For multiplicand digits | 1 gates are opened after, and for multiplicand digits | 8 gates are shut after pulses | 9 | 8 | 7 | 6 | 5 |
| | 2 | 7 | 8 | 6 | 4 | Y | 3 |
| | 3 | 6 | 7 | 4 | X | 2 and 8 | 3 and 5 |
| | 4 | 5 | 6 | 2 | 1 and 8 | 2 and 4 | 2 |
| For multiplicand digits 0 and 9 | | | The gate positions are not altered. | | | | |

For cases X and Y, gates are opened before pulses 5 and 11.

For case X, gates are shut (if necessary) after pulse 1 and altered before pulse 4.

For case Y, gates are shut (if necessary) after pulse 2.

The gates are shut after pulse 10, before and after each carry period and before and after pulse 13.

This table is explained as follows:

The multiplier factor, F, does not exceed 5 for the reason explained above. When the multiplying factor is zero the gates, such as 72, are not opened and the dekatrons are not stepped at all. The register is, however, shifted one place. This multiplication by zero is a trivial case and multiplication by the digits 1 to 5 must now be considered. We will consider only one quintet of trigger tubes in the register at a time because the operation depends on the digit of the multiplicand which in general will differ from one quintet to the other. If the multiplicand digit is 0, 1, 2, 3 or 4 the gate 72 is closed at the beginning of the process and is opened after the pulses marked in the table. (The cases marked X and Y are special cases and will be explained later.) If, on the other hand, the multiplicand digit is 5, 6, 7 or 8, the gate 72 is open at the beginning of the process and is closed after the pulse indicated in the table. When the multiplicand digit is 0, the gate 72 is closed and remains closed through the process. When the multiplicand digit is 9 the gate 72 is open at the beginning of the process and is not effected by any further output from the registers. In the table, a double entry (such as 3 and 5) in the case of the multiplier factor 5 and multiplicand 6 (or 3) means that the gate 72 changes its state after both of the pulses (3 and 5) indicated.

During the multiplication process the contents of the register is stepped on i.e. shifted one place. This stepping on is effected of course by a shift pulse applied to the valves such as 21 in Figure 4 and occurs during (or at least not later than) the 1st, 2nd, 3rd, 4th or 5th digit period acccording as the multiplier factor is 1, 2, 3, 4 or 5, as indicated in the table. Before and after a carry is made the gate 72 is closed and when the multiplicand digit is greater than 4, the gate 72 is opened again after a shift. The gates such as 72 are shut after pulse 10 and before and after pulse 13.

The gates such as 72 are controlled in a special manner in the special cases marked X and Y in the table. In both these cases the gates are opened before pulse 5 and 11. In the case marked X the gates are shut after pulse 1 and are altered before pulse 4. In the case marked Y the gates are shut after pulse 2.

It will be appreciated that the gates such as 72 are controlled by the triggers such as 73 and that when in Table 5 we are instructed to shut the gate, this is done by putting the trigger 73 off. It may happen (in some cases) that the trigger 73 is already off, but this is immaterial because the putting off pulse is applied but has no effect.

It will be seen that, for a given multiplier factor F, some of $(F-1)$ counting pulses are used for adding the tens digit of a product of a multiplicand digit and the multiplier factor to an accumulator stage and some of a separate $(12-F)$ pulses are used for adding the units digit of the product to an accumulator stage. In this embodiment of the invention; some of the first $(F-1)$ counting pulses are used for adding the tens digit of a product to an accumulator stage, some of the $(F+1)$st to the twelfth pulses for adding the units digits of the product to an accumulator stage, and the Fth and thirteenth pulses are used for carry periods.

The invention is not limited to this mode of operation. For instance, some of the first $(12-F)$ counting pulses may be used for adding the units digit of a product to an accumulator stage, some of the $(14-f)$th to the twelfth counting pulses may be used for adding the tens digit of a product to an accumulator stage and the $(13-F)$th and thirteenth pulses may be used for carry periods. In this mode of operation; the shift has to be in the opposite sense of direction. Inspection of the multiplier digits to determine the required multiplier factor would also have to take place in an order of increasing significance instead of an order of decreasing significance as in the present embodiment.

As a further explanation of Table 5, we will consider the working of the circuit in some specific cases:

Consider first a simple case. Say a multiplier factor 3 and a multiplicand digit 2. In this case the gate 72 is initially closed and remains closed until after pulse 4 (see the table). The register shifts during the pulse 3 (see the table). This means that no pulses have been read into the accumulator at the significant place at which the multiplicand digit 2 stood. After the shift to the place of next less significance, pulses 5, 6, 7, 8, 9 and 10 step the dekatron and thus record 6, the required product, in the place of lesser significance. After pulse 10 the gate is shut and no further pulses reach the dekatron.

Consider now the case of the same multiplier factor 3 and a multiplicand digit 7. In this case the gate 72 is initially open, the pulses 1 and 2 pass and step the dekatron, the gate is closed and the register shifts to the place of next lower significance during pulse 3. Since the multiplicand is greater than 4, the gate such as 72 is opened again after the shift and digit 4 is passed to the dekatron in the place of lesser significance. After pulse 4 the gate is closed and remains closed, thus two digits are added to the place of greater significance and one is added to the place of lesser significance in accordance with the multiplication $3\times7=21$.

Consider another case in which the multiplier factor is 3 and the multiplicand digit is 9. The gate 72 is initially opened, pulses 1 and 2 are passed. During pulse 3 the gate is closed, the register shifts, the gates are closed again and are opened again because the multiplicand digit is greater than 4. Pulses 4, 5, 6, 7, 8, 9 and 10 are then added to the place of lesser significance. After the pulse 10 the gate is closed.

We will now consider a somewhat more complicated case, say, a multiplier factor 4 and a multiplicand digit 3. The gate 72 is initially closed. After pulse 2 the gate is opened and pulse 3 passes to add one to the place of greater significance in the accumulator. Before pulse 4 the gate is closed. During pulse 4 the register shifts and the gate is again closed until after pulse 8 when it is opened. Pulses 9 and 10 pass to the accumulator and add two in the place of lesser significance. After pulse 10 the gate closes.

Consider another case of this sort in which the multiplier factor is 5 and the multiplicand digit is 6. In this case the gate is initially open. Pulses 1, 2 and 3 are recorded in the place of greater significance. After pulse 3 the gate is closed and before pulse 5 is closed again (that is to say a pulse tries to close it, see the explanation given above) the register shifts during the pulse 5, the gate is closed and then opened because the multiplicand digit is greater than 4 but is then closed again and no digits are recorded in the place of lesser significance.

Let us now consider one of the awkward cases, say that marked X in the table. The multiplier factor is 3 and the multiplicand digit is, say, 6. The gate is initially open and pulse 1 is added to the place of greater significance. After pulse 1, the gate is closed. During pulse 3 the register shifts and the gate is closed. Because the multiplicand is greater than 4, the gate is immediately opened but before pulse 4 the state of the gate is changed; that is to say the gate is closed. Before pulse 5 the gate is opened and pulses 5, 6, 7, 8, 9 and 10 are passed to the place of lesser significance. After pulse 10, the gate is closed but before pulse 11 the gate is opened again and pulses 11 and 12 are passed to the place of lesser significance. Before pulse 13 the gate is closed. Thus one pulse is passed to the place of greater significance and eight pulses are passed to the place of lesser significance corresponding with the required product $3\times6=18$.

It is an interesting pastime to consider particular cases and the reader will find that provided the rules set out in the table are followed, the required product will be obtained.

We have in Table 5 defined the times relative to the train of thirteen pulses at which the gates such as 72 must be opened, that is to say, we have defined the state of the trigger 73 at these times. We now have to explain how the state of this trigger 73 is controlled.

It will be remembered that the trigger tubes such as 74–78 also constitute gates, and any pulse applied to a particular tube will be passed if that tube is flashed. It will also be remembered that pulses passed by the register trigger tubes such as 74–78 either change the state of the trigger 73, or put it off according to the state of the gates 714 and 715. Other pulses have to be applied at certain times definitely to put the trigger 73 off. Pulses also have to be applied to the shift input to the register.

The timing of all these pulses for the different multiplier digits 1, 2, 3, 4 and 5 is defined by the diagrams in Figures 12(*a*), 12(*b*), 12(*c*), 12(*d*) and 12(*e*) respectively.

It has already been explained that the tracks on the magnetic storage drum are divided notionally into 14 sectors. These sectors are again divided notionally into 13 sub-sectors, each comprising 10 divisions. The timing of the 13 sub-sectors is indicated at (i) of each of the diagrams 12(*a*) to 12(*e*). At (ii) is shown the waveforms of the 13 pulses in the train. These pulses start at divisions 4 in each sub-sector as shown. At (iii), (iv), (v), (vi) and (vii) there is shown respectively pulses applied to all tubes in the multiplicand register in the 1/8, 2/7, 3/6, 4/5 and >4 levels. At (viii) there is shown the waveform of the potential applied to the shift inputs of the register. At (ix) there is shown carry pulses applied to the carry-memory tubes such as 712. These carry pulses are also used to gate other pulses in a manner to be explained later. The purpose of the pulses shown at (x) will be shown later. The pulses shown at (xi) are applied to the trigger 73, via the gate 714, to reset it. At (xii) there is shown the waveform of a controlling potential applied to the gates such as 714 and 715. This potential is applied so that at its higher value the gate 715 is shut, and at its lower value the gate 715 is open. The points at which the potentials in Figures 12(*a*) to 12(*e*) are applied in Figure 10 are number (ii)—(xii) to correspond with the waveform diagrams.

It will be appreciated that the pulses applied to the trigger tubes in the register will be passed by only those tubes which are flashed. It should also be explained that the pulse shown in dotted lines on line (xi) corresponds with the back edge of the shift pulse and in fact the circuit (Figure 14) is such that when the register is shifted it automatically produces a pulse which puts the triggers such as 73 off at the back edge of the shift pulse. Certain pulses are common to all diagrams. These pulses are shaded.

It will be noticed that in all cases some of the pulses on lines (vii), (x) and (xi), in the sub-sectors 0, 1, 2, 3, 4, 5 and 12, are embraced by the carry pulse and the carry pulse, whose position will depend upon the current multiplier, can then be used to gate out the appropriate pulses for each multiplier. This leads to a reduction in apparatus.

It will be seen that the shifting pulse occurs one sub-sector earlier than would be expected from Table 5 in the case of multiplier digits 2, 3, 4 and 5. This arrangement is adopted because the back edge of the shift pulse puts the trigger 73 off at a convenient time.

When the current multiplier factor is zero no pulses are applied to the circuit except a shift pulse which occurs at the time specified for the multiplier digits 1 and 2.

It will not be necessary here to consider the effect of all the pulses shown in the diagrams but it will be found that they had produced the effects required by Table 5. By way of explanation we will however consider in detail four examples, namely, 5×5, 2×9, 4×2 and 4×7.

Consider first the multiplication 5×5. In the register the 4/5 and >4 trigger tubes will be flashed so that the pulses on lines (vi) and (vii) in Figure 12(*e*) will be effective. Initially the gate 72 is closed (by the resetting pulse which occurs in sub-sector 12 on line (xi) in all cases). The first pulse through the >4 tube opens the gate 72. The reader will notice that the waveform on line (xii) indicates that the gate 715 is open so that the pulse from the >4 tube goes to a changeover input of the trigger 73. In all cases the pulses from the register trigger tubes must be considered in conjunction with states of the gates 714 and 715, as indicated by the waveform on line (xii). The digit pulses 1 and 2 pass to the dekatron. The pulse from the 4/5 tube closes the gate 72. The register then shifts and the back end of the shift pulse tries to shut the gate again. A carry, if any, is recorded, the pulse on line (xi) tries to close the gate, the next pulse from the >4 trigger tube opens the gate and digit pulses 6, 7, 8, 9 and 10 are recorded in the position of lower significance. The gate is closed during digit pulse 10 by the pulse on line (xi) and the next pulse on the line (xi) tries to close the gate during the digit pulse 12, a carry digit, if present, is recorded and the last pulse on line (xi) closes the gate or tries to close it. The circuit is now back in its initial state ready for the next multiplication by a multiplier factor.

Consider now the multiplication 2×9. In the register only the >4 trigger tube is flashed. The gate 72 is initially closed. The first pulse from the >4 tube opens the gate and the shift commences (Figure 12(*b*)). The first digit pulse passes in the position of greater significance and the gate is closed at the end of the shift pulse. A carry, if any, is recorded and if necessary the gate is closed again by the reset pulse on line (xi). The next pulse from the >4 tube opens the gate and pulses 3, 4, 5, 6, 7, 8, 9 and 10 are recorded in the position of lesser significance. The gate is closed by the next resetting pulse on line (xi) and the process of forming the partial product finishes as in the previous case.

Consider now the multiplication of 4×2. In the register the trigger tube 2/7 only is flashed. The gate 72 is initially closed. The first pulse from the 2/7 tube tries to close the gate Figure 12(*d*). Next the shift commences and at the end of the shift a pulse tries to close the gate again, a carry, if any, is recorded and a resetting pulse closes or tries to close the gate again. The next pulse from the 2/7 tube opens the gate, the next one which occurs very soon afterwards, see line (iv), closes the gate and the next one opens the gate again. Digit pulses 5, 6, 7, 8, 9 and 10 are recorded, the gate is closed during the digit pulse 10 but is opened again before digit pulse 11, and digit pulses 11 and 12 are recorded. The multiplication process then terminates as in the other cases.

Consider now the multiplication 4×7. The trigger tubes 2/7 and>4 will be flashed in the register. The gate 72 is initially closed, the first pulse from the >4 tube will open the gate (Figure 12(*d*)) and digit pulses 1 and 2 will be recorded in the place of greater significance. The gate is shut by the next pulse from the 2/7 tube. Next the shift commences and at the end of the shift a pulse tries to close the gate again. A carry, if any, is recorded and again a pulse closes or tries to close the gate. The next pulse from the 2/7 tube opens the gate, the next pulse from the 2/7 and the >4 tubes closes the gate, the next pulse from the 2/7 tube opens the gate and digit pulses 5, 6, 7, 8, 9, 10 are recorded in the place of lesser significance. The gate is closed during digit pulses 10 but opened again before digit pulse 11 and digit pulses 11 and 12 are recorded. The multiplication process terminates as in all the other cases.

The diagrams Figures 12(*a*) to 12(*e*) have been carefully drawn to scale but it is necessary to specify the timing of the various control pulses accurately. The sectors into which the magnetic drum is notionally divided are numbered 0–13, the sub-sectors are numbered 0–12 and the divisions 0–9. The short pulses are generated by a single mark on the phonic wheels and are 2½ micro-seconds long. Other pulses are recorded on the phonic wheels by a pair of marks, the first of which puts a trigger on to initiate the pulse and the second of which puts the trigger off to terminate the pulse. The digit and shift pulses are on for 25 microseconds, and the carry pulses are on for 45 microseconds. The time of each sub-sector is 50 microseconds and the time of each sector is therefor 650 microseconds. This information together with the times of starting of all the pulses will accurately define the pulses. Times are defined by a notation in the form A/B/C, where A defines the number of the sector, B defines the number of the sub-sector and C defines the division. If a pulse occurs in all sectors the first figure in this notation is omitted and if a pulse occurs in all sub-sectors the first two figures in the notation are omitted.

With this notation the digit pulses occur at times 4.

For all cases except a multiplier factor of 0 or 1 the first pulse on the line (x) (the purpose of which has still to be explained) is timed 0/0 and the first pulses on line (vii) applied to the >4 trigger tubes are timed 0/1. The fixed carry pulses are timed 12/3. The timing of the start of the other pulses which vary according to the multiplier factor is set out in the following table:

*Table 6*

| Line in Figures 12(*a*)–(*e*) | Pulses routed to— | Figure / Multiplier Factor, F | 0 | 1 | 2 | 3 | 4 | 5 |
|---|---|---|---|---|---|---|---|---|
| | | Figure | -------- | 12(*a*) | 12(*b*) | 12(*c*) | 12(*d*) | 12(*e*) |
| | | Multiplier Factor, F | 0 | 1 | 2 | 3 | 4 | 5 |
| (iii) | 1/8 trigger tubes | | -------- | 9/3 | 8/3 | 7/3 | 6/3 | 5/3 |
| (iv) | 2/7 trigger tubes | | -------- | 8/3 | 6/3 | 4/3 | 1/8, 4/0, 4/1, 4/3, 10/3 | 3/2 |
| (v) | 3/6 trigger tubes | | -------- | 7/3 | 4/3 | 0/8, 3/3, 3/8, 4/3, 10/3 | 2/2, 8/3 | 3/2, 5/3 |
| (vi) | 4/5 trigger tubes | | -------- | 6/3 | 2/3 | 1/2, 8/3 | 2/2, 4/3 | 2/3 |
| (vii) | >4 trigger tubes (second pulse) | | -------- | 1/1ˣ | 2/1 | 3/1 | 4/1 | 5/1 |
| (viii) | Start shift pulse | | 0/3 | 0/3 | 0/3 | 1/3 | 2/3 | 3/3 |
| (ix) | Start moving carry pulse | | -------- | -------- | 1/3 | 2/3 | 3/3 | 4/3 |
| (x) | Complement (second pulse) | | -------- | 1/0ˣ | 2/0 | 3/0 | 4/0 | 5/0 |
| (xi) | Reset trigger 73 after carry | | -------- | -------- | 1/8 | 2/8 | 3/8 | 4/8 |
| | | | Timing | | | | | |

In general, pulses applied to lines (vii) and (x) and the pulses applied to line (xi) to reset the trigger 73 after carry (when a carry pulse is present) are gated from the phonic wheel by the carry pulse except where marked in the table at $x$. In practice, in order to conserve apparatus, a moving carry pulse is allowed to be present at time 0/3 when multiplying by a multiplier factor 1 and, therefore, the pulses at times marked $x$ are, in fact, gated by this carry pulse. Also the circuits associated with the phonic wheel are arranged to give no output at 0/0/0 and 0/0/1. When the multiplier factors are 0 or 1, the first pulses generally supplied at times 0/1 and 0/0 from the circuits associated with the phonic wheel to the >4 trigger tube and to the line (x) respectively are, in effect, suppressed.

It will be remembered that the digits of the multiplier have to be scrutinised in pairs to determine the actual multiple to be formed in accordance with Table 4. This scrutinising process takes two sector times to complete. Multiplication ends in sector 13, although the least significant figure of the multiplier leaves the store at sector 12 passes the reading heads, so that the function of the least significant figure of the multiplier is only to modify, or not to modify as the case may be, the next least significant figure of the multiplier.

The digits of the multiplier are scrutinised as follows: A shifting register similar to the main shifting register but having only two stages, as shown in Figure 13 is used. In this diagram the quintet of tubes on the left contains the less significant digit and the quintet of tubes on the right contains the more significant digit of the multiplier. A shift pulse passes the less significant digit to the more significant part of the register and then the next less significant digit from the store is let in to the left-hand part of the register. There is no shift from the more significant part of the register to the least significant part of the register. It will be remembered that the actual multiple formed depends upon whether the multiplier digits considered are greater than 4 or not greater than 4. Consequently the determination may be made by passing an inspection pulse to the >4 trigger tube in the less significant quintet. The process is as follows: When a digit is registered in the left-hand quintet in Figure 13, an inspection pulse is applied to the >4 trigger tube. If this tube is flashed, the inspection pulse puts a trigger 101 (which has previously been put off) on. On the other hand, if the >4 tube has not been flashed, the inspection pulse has no effect on the trigger 101. The multiplier digit which has been inspected and which we will call, for the time being, the current multiplier digit, then passes to the right-hand quintet of the register and the next less significant figure enters the left-hand quintet of the register. This digit is inspected via the same >4 trigger tube and changes or does not change, according as the digit is greater than 4 or less than five, the state of the trigger 101. At this stage the output from the trigger 101 is used to modify (if necessary) the multiplying effect of the current multiplier digit which now rests in the right-hand quintet of the register. The method of controlling the control pulses by the current multiplier digit and the method of modifying this control will be explained later, but at this point we must explain that the multiplier digit in the left-hand side of the register in Figure 13, which is the next current multiplier digit, is examined again to determine what effective value it shall have when it comes to be used. To do this the trigger 101 is put off and the digit is inspected, as already described for the current multiplier digit. It is now convenient to explain the method by which multiplier digits are used to route the appropriate control pulses of the kind shown in Figure 12 to the proper parts of the circuit shown in Figure 10. In Figure 12($a$)–12($e$) the pulses are on lines marked (ii)—(xii) and these are applied at the parts similarly numbered in Figure 10.

The circuit for doing this is shown in Figure 14. Each effective multiplier digit (i.e. each actual multiplier factor, F) causes a potential to become present on one of six multiplier control lines marked X0, X1, X2, X3, X4 and X5 in Figure 14. The potential of these lines gates the pulses designated in the diagram to the points in Figure 10 corresponding to the numbered outputs (iii—xi) from the gates in Figure 14. Most of Figure 14 is self explanatory but it should be explained that the triggers 111 and 112 respectively generate the shift and carry pulses.

It will be noticed that the shift trigger 111 resets (via the input (xi)) the trigger 73 through the end element 113. It will also be noticed that the carry trigger gates pulses timed 8 to the input (xi), timed 0 to the input (x) and timed 1 to the input (vii) in Figure 10.

This arrangement leads to economy in apparatus associated with the phonic wheels. In certain cases (to be explained later) the input to (x) may be inhibited at the gate 114. It will also be noticed that pulses timed 0/0 and 0/1 are gated through the gate 115 to the input (x) when the multiplier factor is 0 or 1. These pulses are necessary because pulses timed 0 and 1 in all sub-sectors which are used for multiplication are gated through by the carry trigger 112. Now in the case of multiplication by 0 or 1 these are not wanted (as explained with reference to Table 6) and the effect of the pulse passed by the gate 115 is to counteract the effect of the unwanted pulses on the trigger 73 in Figure 10.

The trigger-tube gate 116 is used to prevent the shift trigger 111 being operated except in sectors 6 to 13.

It is now necessary to explain how the current multiplier digit sets up a potential on its appropriate multiplier line X0, X1, X2, X3, X4 or X5. The output from the 1/8, 2/7, 3/6 or the 4/5 tube in the right-hand quintet in Figure 13 is used to set up a potential on the line Y1, Y2, Y3 or Y4 respectively. These lines are shown at the left-hand side of Figure 15. If the effect of the current multiplier digit is not modified, the potential on any of these lines will appear on the corresponding line X1, X2, X3 or X4. These potentials are transmitted via the gates 121, 122, 123 and 124. If, however, a modifying output is coming from the trigger 101 in Figure 13, this output will inhibit the gates 121–124 and open the gates 125, 126, 127 and 128 and the multiplying potential on a line at the left-hand side of Figure 15 will appear on the next higher corresponding line at the right-hand side of Figure 15. Thus a potential on the line Y3 will pass via the gate 127 to the line X4.

In the case where a current multiplier digit is a zero but has to be modified, a potential must appear on the X1 line, and this potential is merely the output from trigger 101 as shown. It will of course be seen that if any of the lines Y1, Y2, Y3 or Y4 are energised, the output from the trigger 101 will be stopped by the gate 129.

The control potential on the line X0 is present except when inhibited by any potential on lines Y1 to Y4 or on the modifying line from the trigger 101 in Figure 13.

When the current multiplier digit is greater than 4, the >4 trigger tube in the right-hand quintet in Figure 13 will be flashed and will pass a pulse from the phonic wheel applied to it at time 12/3 via the input line 106. If Figures 12($a$)–12($e$) are carefully studied, it will be seen that the effect of the pulses on line (x) when present is to nullify the effect of all the pulses passing through the >4 trigger tube in the arithmetical register, if this tube is flashed. On the other hand if this tube is not flashed, the pulses on line (x) will produce the same result as would be produced if the >4 tube had been flashed and the pulse on line (x) had not been present. These effects of a pulse on the line (x) follow from the fact that (except during multiplication by 0 to 1) the pulse or pulses on the line (x) occur at times P/0 just before the pulse or pulses on line (vii) applied at times P/1 (P being the subsection in which the pulses occur) to the >4 trigger tubes, such as the trigger tube 78 shown in Figures 10 and 11. Furthermore, the pulses on the lines (x) and (vii) occur while the gate 714 is shut and the gate 715 is open due to a pulse applied to the line (xii) in Figure 10. Therefore, the state of the trigger 73 is changed by each pulse on the lines (x) and (vii). These changes (if any) take place before the next digit pulse applied to the line (ii) in Figure 10. The net effect is as follows. If a pulse is present on the line (x) but the trigger tube 78 is not flashed, the state of the trigger 73 will be changed as if the trigger tube 78 were flashed. However, if a pulse is present on the line (x) and the trigger tube 78 is flashed, then, firstly, the pulse on the line (x) changes the state of the trigger 73 and, secondly, a pulse on the line (vii) changes the state of the trigger 73 to its original state as if the trigger tube 78 were not flashed. Thus the digit held in each stage of the arithmetical register is effectively complemented on nine. It will be seen therefore, that if a digit M is set up in one stage of the arithmetical register, the pulses on the line (x) will cause the product of a multiplier factor F and $(9-M)$ to be added to the accumulator. It follows that the pulses on line (x) that pass to the circuit in Figure 10 effectively complement the number on the arithmetical register.

In the straightforward case of a positive product of positive multiplicand and multiplier (other cases will be considered in detail later) this pulse is arranged to put the trigger 102 on and this trigger gates pulses through the gate 114 to the point (x) in Figure 10. These pulses are the pulses on line (x) in each of Figures 12(*a*)–12(*e*).

It will be remembered that taking the complement of the multiplicand and multiplying by a given digit and then adding into the accumulator, is equivalent to multiplying by minus the digit and adding in algebraically the result to the accumulator.

If this part of the circuit is carefully considered it will be found that it effectively gives the required factors specified in Table 4. For example, suppose the current multiplier digit is 4 and the digit of next less significance is 2, then the trigger 101 in Figure 13 is not put on and unmodified multiplication at the current digit takes plate.

Consider now the case in which the current multiplier digit is greater than four, say 7, and suppose that the digit of next less significance is less than five, say 3, then the required multiplier factor is —3. When the current multiplier digit (7) is inspected the trigger 101 is put on. When the digit of next significance (3) is inspected, the trigger is unchanged and remains on. The multiplier now stands in the right-hand side of the register in Figure 13, and the 2/7 and >4 trigger tubes will be flashed. The 2/7 trigger will yield a potential on the line Y2. This will yield a potential on the multiplier line X3 because the trigger 101 is on. At the same time the >4 trigger tube will be flashed and the multiplicand effectively complemented in the manner described. The net result of all this is that an effective multiplication by the factor —3 is obtained, as required by Table 3. The reader may easily verify that in any case the requirements of Table 3 are met.

Figure 13 also shows a trigger tube 103 which is flashed during sector 3 by means of a pulse from the trigger tube 15 of the recoder shown in Figure 3 (the recoder 32 shown in Figure 6) wherever a number transferred to the arithmetical register is negative. This tube is inspected during the first revolution of the phonic wheels in multiplication by the application of a pulse to it via line 106 at time 4/10/5 so that the trigger 102, which is initially off, will be put on if the multiplicand is negative. The trigger tube 103 is then put off if necessary at time 4/11/4. The trigger tube 103 is flashed in sector 3 at time 11/4 to 11/9 during the second revolution of the phonic wheels in multiplication if the multiplier being transferred to the multiplier register is negative. The trigger tube 103 is again inspected by means of a pulse applied to it via line 106 at time 4/10/5, so that if it is flashed the trigger 102 will change its state. The trigger tube 103 is put off if necessary a time 4/11/4.

If the product is to be subtracted from the accumulator an additional pulse is allowed through a gate 107 at time 3/12/8 to change the state of the trigger 102. Thus, for example, if the product is positive and is to be subtracted from the accumulator, the trigger 102 will be on. This will result in the complement of the product being added to the accumulator.

The sequence of events in the circuit of Figure 13 is as follows. The triggers 101 and 102 are initially off. A pulse at time 4/10/5 in the first turn of the phonic wheel in multiplication inspects via line 106 the trigger tube 103 containing the sign digit of the multiplicand and puts the trigger 102 on if the trigger tube 103 is flashed. A pulse at time 4/11/4 puts the trigger tube 103 off. The sign digit of the multiplier is transferred to the trigger tube 103 during the third sector of the second turn of the phonic wheel in multiplication and flashes the trigger tube 103 if the sign digit is a 9. A pulse at time 4/10/5 inspects via line 106 the trigger tube 103 and changes the state of the trigger 102 if the trigger tube 103 is flashed. A pulse at time 4/11/4 puts the trigger tube 103 off.

The first multiplier digit is transferred to the left-hand quintet of trigger tubes at time 4/11/4 to 4/11/9 by means of a pulse applied to the line 113 in Figure 3 during that time. A pulse at time 4/12/3 inspects the trigger tube >4 and puts the trigger 101 on if the trigger tube >4 is flashed. Multiplication by 1 or, in effect, by minus 1 if the trigger 102 is on, takes place in sector 5 (with shift inhibited) if the trigger 101 is on. The trigger 101 is put off if not already off at time 10/4. A pulse at time 10/5 inspects the trigger tube >4 again and this puts the trigger 101 on or not as the case may be. At time 10/6 to 11/1 the contents of the register is shifted to the right (as shown in Figure 13) and at time 11/4 to 11/9 in sector 5 the second most significant multiplier digit is transferred from the recoder shown in Figure 3 to the left hand quintet of trigger tubes in Figure 13. At time 12/3 in sector 5 the trigger tubes >4 are inspected in both quintets of trigger tubes and the states of the triggers 101 and 102 changed or not as the case may be. Multiplication by the most significant multiplier digit then takes place in sector 6. (Of course, the most significant multiplier digit may be modified if the trigger 101 is on and the partial product may be complemented if the trigger 102 is on.) The sequence of events is then repeated until multiplication by the eighth multiplier digit (modified or not modified) takes place in sector 13. At time 13/10/4 the multiplier register is cleared and the triggers 101 and 102 are put off if they are not already off.

A gate 109 inhibits the clearance of the trigger 102 in the first turn of the phonic wheel in multiplication.

It should be explained here that when a product or the complement of a product is added to the accummulator, the accummulator is always arranged to be empty (that is to say, it records a series of nines). Thus when a product is to be added to an accumulator having a number recorded in it, the programme of the engine is so arranged that the contents of the accumulator is cleared to the store as the multiplicand is transferred to the arithmetical register. The number that was in the accumulator is then transferred from the store to the arithmetical register and added to the product in the accummulator after the multiplication has been carried out (that is to say, during a third revolution of the phonic wheel).

Now, as hereinbefore explained, multiples are added to the accumulator during sectors 5 to 13 and the trigger 102 changes its state or does not change its state during each sector of this time according to whether the trigger tube >4 in the register holding the most significant multiplier digit is flashed or not. The trigger 102 controls a trigger tube 104 so that the trigger tube 104 is flashed only if the trigger 102 is on. If the trigger tube 104 is flashed between times 0/0 to 10/3 in any of sectors 5 to 13 inclusive, nine pulses are fed through a gate 108 to a sign stage counter comprising a dekatron 105. The gate 108 is inhibited if the X0 line in Figure 15 is energised so that the nine pulses are not fed to the dekatron 105 if nothing is subtracted, in effect, from the accumulator. The dekatron 105 is called the sign dekatron. Thus nine pulses are always fed down to the sign dekatron 105 whenever a complemented partial product is added to the accumulator.

Since, for multiplication, the accumulator is initially empty, it follows that the initial multiple added to the accumulator always has the same sign as will have the final total product in the accumulator. Also the sum of the multiples in the accumulator will at no time change its sign because all the subsequent multiples added to or in effect subtracted from, the accumulator in their proper significance will always be less in magnitude than the initial multiple. Thus it will be seen that if the initial multiple is added to the accumulator as a positive number, nothing will be recorded in the sign dekatron 105. However, if another multiple is in effect subtracted from the accumulator (that is added to the accumulator as the number complemented with respect to nines), nine pulses will be recorded in the sign dekatron 105. A carry pulse will always occur, in this case, from the most significant stage of the accumulator. The carry pulse will not only be passed to the least significant stage of the accumulator but will also be passed through the gate 720 (Figure 8) to the sign dekatron 105 so that this dekatron will return to its initial state and record 0 representing a positive number in the accumulator.

A further example will now be taken. Let it be assumed that the initial multiple is subtracted from the accumulator (i.e. added as a negative number). Nine pulses will then be recorded in the sign dekatron. If the next multiple is added to the accumulator (i.e. as a positive number), no more pulses will be added to the sign dekatron, no end carry will occur, and the dekatron will record 9 representing a negative number in the accumulator. If the next multiple is subtracted from the accumulator (i.e. added as a negative number), nine more pulses will be passed to the sign dekatron so that it will record 8. However, a carry pulse will occur from the most significant stage of the accumulator causing the sign dekatron to be stepped and record 9 representing a negative number in the accumulator.

A specific example will now be taken. Let the multiplicand and the multiplier be negative and let it be required that the product be taken away from the empty accumulator. Also let the first four most significant figures of the multiplier be 1763 . . . . Then at time 4/10/5, during the first turn of the phonic wheel, a pulse passes through the trigger tube 103 to put the trigger 102 on. At time 4/11/4 the trigger tube 103 is put off. At time 3/11/4 to 3/11/9 during the second turn of the phonic wheel, the trigger tube 103 is flashed. At time 3/12/8 a pulse passes through the gate 107 to put the trigger 102 off. At time 4/10/5 a pulse passes through the trigger tube 103 to put the trigger 102 on. At time 4/11/4, the trigger tube 103 is put off.

Meanwhile at time 11/4 to 11/9 the digit 1 is transferred to the left-hand quintet of trigger tubes. At time 4/12/3 a pulse inspects the trigger tubes >4 in both quintets of trigger tubes. At time 5/10/4 a pulse tries to put the trigger 101 off. At time 5/10/5, a pulse inspects the trigger tubes >4 again. At time 5/10/6 to 5/11/1 the contents of the multiplier register shifts. At time 5/11/4 to 5/11/9 the digit 7 is transferred to the left-hand quintet of trigger tubes. At time 6/12/3, a pulse inspects the trigger tubes >4 and the trigger 101 is put on. Multiplication by 2 takes place, the complement on nines of the second multiple of the multiplicand is added to the accumulator and nine pulses are passed to the sign dekatron 105. At time 6/10/4 the trigger 101 is put off. At time 6/10/5, a pulse inspects the trigger tubes >4 and the trigger 101 is put on. At time 6/10/6 to 6/11/1 the contents of the register shifts. At time 6/11/4 to 6/11/9 the digit 6 is transferred to the left-hand quintet of trigger tubes. At times 6/12/3 the trigger tubes >4 are inspected and the trigger tubes 101 and 102 are put off. Multiplication by 2 takes place. No pulses are sent to the sign dekatron since the trigger tube 104 is put off at 6/12/3. At time 7/10/4 the trigger 101 is off. At time 7/10/5 the trigger tubes >4 are inspected by a pulse and triggers 101 and 102 are both put on. At time 7/10/6 to 7/11/1 the contents of the register shifts. At time 7/11/4 to 7/11/9 the digit 3 is transferred to the left-hand quintet of trigger tubes. At time 7/12/3 the trigger tubes >4 are again inspected by a pulse and the trigger tube 102 is put off. Multiplication by 4 takes place in sector 8. At time 8/10/4 the trigger 101 is put off. At time 8/10/5 the trigger tubes >4 are inspected by a pulse and the trigger tube 102 is put on. At times 8/10/6 to 8/11/1 and 8/11/4 to 8/11/9 the contents of the register is shifted and the next number, say less than five, is transferred to the left-hand quintet of trigger tubes. At time 8/12/3 the trigger tubes >4 are inspected and no pulse passes to affect the triggers 101 and 102. Multiplication by 3 therefore takes place, the complement on nines of the multiple is added to the accumulator and nine more pulses are passed to the sign dekatron 105, this dekatron will then record 8 but a carry pulse will be passed to it so that it will finally record 9.

A similar process occurs for all the other multiplier digits. The final product in the accumulator will be the complement on nines of a number which is negative. When the contents of the accumulator are transferred back to the store, the sign digit will be transferred to the recorder shown in Figure 7 during sector 3. If it is a nine, as in the example hereinbefore given, the recoder sets up a circuit so arranged that the biasses are applied to the trigger tubes 41 to 44 in Figure 7 at times indicated by *x* in Table 2 as the significant figures in the accumulator are transferred.

An example will now be given to illustrate the actual process of adding products to the accumulator. It will be assumed that all the accumulator dekatrons have their discharges standing on their ninth cathodes. This will, in fact, always be the case at the beginning of multiplication. The number stored in the accumulator will, therefore, be initially, 9 9 9 9 9 9 9 9 9.

Let the multiplicand transferred to the arithmetical register be 1 3 2 8 7 5 9 6 4 and let the multiplier be 573. Then according to Table 4 the factors by which the multiplicand (suitably shifted where necessary) has to be multiplied are 1, —4, —3 and 3. Addition to the accumulator will occur in the following stages.

(1) Multiplying by the multiplier factor with shift inhibited;

```
  : 9 9 9 9 9 9 9 9 9=number stored in accumulator
  :
  : 0 0 0 0 0 0 0 0 0=tens digits of the product
  :                        1 3 2 8 7 5 9 6 4 × 1
  -------------------
  :
  : 9 9 9 9 9 9 9 9 9
  :
  : 1 3 2 8 7 5 9 6 4=units digits of the product
  :                        1 3 2 8 7 5 9 6 4 × 1
  -------------------
  :
1 : 1 3 2 8 7 5 9 6 3
  :
  :                 1=carry digit from the most significant
  :                                     stage of accumulator
  -------------------
  :
  : 1 3 2 8 7 5 9 6 4
```

(2) Multiplying 8 6 7 1 2 4 0 3 5 (the complements on nines of the digits of the multiplicand) by 4;

```
  : 1 3 2 8 7 5 9 6 4=number stored in the accumulator
  : 3 2 2 0 0 1 0 1 2=tens digits of the product
  :                      8 6 7 1 2 4 0 3 5 × 4
  ---------------------
  : 4 5 4 8 7 6 9 7 6
  : 6 2 4 8 4 8 6 0 2=units digits of the product
  :                      9 8 6 7 1 2 4 0 3 × 4
  ---------------------
1 : 0 7 9 7 2 5 5 7 8
  :              1=carry digit
  ---------------------
  : 0 7 9 7 2 5 5 7 9
```

(3) Multiplying 9 8 6 7 1 2 4 0 3 (the complement on nine of the digits of the multiplicand remaining in the arithmetical register after shift) by 3;

```
  : 0 7 9 7 2 5 5 7 9=number stored in the accumulator
  : 2 2 1 2 0 0 1 0 0=tens digits of the product
  :                      9 8 6 7 1 2 4 0 3 × 3
  ---------------------
  : 3 0 0 9 2 5 6 7 9
  : 7 7 4 8 1 3 6 2 0=units digits of the product
  :                      9 9 8 6 7 1 2 4 0 × 3
  ---------------------
1 : 0 7 5 7 3 9 2 9 9
  :              1=carry digit
  ---------------------
  : 0 7 5 7 3 9 3 0 0
```

(4) Multiplying 0 0 1 3 2 8 7 5 9 (the digits of the multiplicand remaining in the arithmetical register) by 3;

```
  : 0 7 5 7 3 9 3 0 0=number stored in the accumulator
  : 0 0 0 0 0 2 2 1 2=tens digits of the product
  :                      0 0 1 3 2 8 7 5 9 × 3
  ---------------------
  : 0 7 5 7 4 1 5 1 2
  : 0 0 0 3 9 6 4 1 5=units digits of the product
  :                      0 0 0 1 3 2 8 7 5 × 3
  ---------------------
  : 0 7 6 1 3 7 9 2 7=the required product
```

No mention has been made, so far, of the exponents of the multiplicand and multiplier. Clearly these have to be added to form the exponent of the product. This addition is done in a separate two-stage accumulator similar to the nine-stage accumulator hereinbefore described. Figure 16 shows part of the two-stage accumulator comprising dekatrons 671 and 672, trigger tubes 673 and 674, triggers 675 and 676 and gates 677, 678, 679 and 680. Associated with the accumulator is a two-stage register which may be the same register as that for holding multiplier digits as shown in Figure 13. This two-stage register is shown in Figure 16 as two quintets of trigger tubes, the trigger tubes >4 of which are indicated at 681 and 682. During sectors 1 and 2 of the drum turn during which the multiplicand is transferred to the arithmetical register the tens and units digits of the multiplicand's exponent are set up respectively in the right-hand and left-hand quintets of trigger tubes (as shown in the drawing).

During the sector 3 of the same drum turn the multiplicand's exponent is added to the accumulator by the process of multiplication by 1, as already described for the multiplication by a factor 1 during multiplication, but with the shift inhibited. However, it will be remembered that a negative exponent is coded on the exponent's register as the units digit as it is and the complement on nine of the tens digit of the exponent. In the accumulator negative exponents are stored as the complements on nine of both of the exponent digits.

In order to effect this, two inhibiting gates 683 and 684 are interposed between the trigger tubes 681 and 682 and the gates 677 and 678. The gates 683 and 684 are so connected to the trigger tubes 682 and 681 respectively that the gate 683 is shut when the trigger tube 682 is flashed and the gate 684 is shut when the trigger tube 681 is flashed. This has the effect that if only one of the trigger tubes 681 and 682 are flashed the pulses applied to the trigger tubes >4 are passed to the trigger 675, but if both or neither of the trigger tubes 681 and 682 are flashed no such pulses are passed to the trigger 675. It follows that if the exponent is negative (and thus the trigger tube 682 is flashed to signify that the tens digit of the exponent is coded as a 9 or an 8) the complement of the units digit of the exponent will be added to the units exponent dekatron.

For example, if the exponent of the multiplicand is −17 this will be coded on the register as 87. Thus the trigger tubes 2/7 and >4 will be flashed in the left-hand quintet and the trigger tubes 1/8 and >4 will be flashed in the right-hand quintet. When multiplication by one takes place during sector 3 with the shift inhibited, the pulses applied to the trigger 675 will be only those passed through the 2/8 trigger tube of the left hand quintet because the gates 683 and 684 will both be inhibited. Thus only two pulses will be fed to the dekatron 671. The pulses applied to the trigger 676 will be those passed through the trigger tubes 1/8 and >4 of the right-hand quintet and thus eight pulses will be fed to the dekatron 672. The exponent's dekatrons will, therefore, record 82, the complement on 99 of 17.

In a similar manner, during sectors 1 and 2 of the drum turn during which multiplication takes place, the exponents of the multiplier are set up in the two-stage register (which has by this time been cleared). During sector 3 the exponents of the multiplier are added to the two-stage accumulator by the same multiplication process. If necessary carry takes place not only from the dekatron 671 to the dekatron 672 but also from the dekatron 672 to the dekatron 671 as in the accumulator described with reference to Figures 9 and 10. Clearance of the dekatron 671 and 672 to the recoder illustrated in Figure 7 is also similar to that described with reference to Figures 9 and 10. In this case, however, if the tens digit of the exponent recorded in the dekatron 672 is shown to be an 8 or a 9 as that dekatron is cleared, the recoder sets up a circuit so arranged that the biasses are applied to the trigger tubes 41 to 44 in Figure 7 at times indicated by $x$ in Table 3 as the dekatron 671 is cleared. In this manner, an exponent stored in the accumulator as 82 will be recoded, in the four-channel code of Table 1, as 87, thus signifying an exponent of −17.

It is convenient at this stage to note that the arrangements of the gates 683 and 684 in relation to the two-stage register may, if desired, be used to determine whether none, one or both of two multiplier digits coded in the register is greater than four. Thus, this part of the circuit of Figure 16 may be used to replace part of the circuit of Figure 13. Of course, pulse and shift timings different from those used in relation to the circuit of Figure 13 would have to be used in this case.

The method of addition will now be described. During one rotation of the phonic wheel the augend (if it is not already in the accumulator and the accumulator is empty) is transferred first to the registers and then to the accumulator and the exponents dekatrons and sign dekatrons. This is accomplished by first transferring the augend's exponent digits to the two exponent quintets, the augend's sign to the sign quintet (as a 0 or a 9) and the augend's significant digits to the arithmetical register via the register's recoder shown in Figure 3 and the control ring described with reference to Figure 5. This occurs in sectors 1 to 12 as hereinbefore explained. During sector 13, the augend's exponent and significant figures are multiplied by one and added to the accumulator. The shift during this multiplication is inhibited, in addition, by a gate 117 shown in Figure 14. Thus the augend's exponent is recorded on the exponent dekatrons, its sign on the sign dekatron and its significant figures in the accumulator.

The addend's exponents are then transferred to the exponents' quintets in sectors 1 and 2 of the next turn of the phonic wheel. Immediately, during sector 3, the addend's exponent is subtracted from the augend's exponent by multiplying by minus one and inhibiting the shift. If, after such a subtraction, the exponent dekatrons record 51 to 98, 99 or 01 to 48, the addend's exponent is respectively greater than, equal to or less than the augend's exponent. If the exponent dekatrons record 10 to 48, no addition is needed because the addend will be too small to affect the augend. Also, if the exponent dekatrons record 51 to 89, the accumulator is cleared before the addition of the addend because the augend is to small to affect the addend.

If the exponent dekatrons record 01 to 09, then the discharge in the control ring is shifted by pulses a number of times equal to the units digit recorded in the exponent dekatrons. Thus the discharge in the control ring is shifted from the stage indicating the augend's most significant digit to the stage indicating that to which the addend's most significant digit will be added. The addend's digits are then distributed during sectors 4 to 12, to the arithmetical register until the register stage holding the most significant digit of the augend is reached, when the distribution ceases and the control ring then indicates stage holding the augend's most significant figure.

It should be noted that in the engine the discharge in the control ring indicates the stage in the arithmetical register and the accumulator containing the most significant figure except when transfer to the register or from the accumulator is taking place and, except in certain circumstances, immediately after a carry has occurred from the most significant stage. These circumstances will be explained hereinafter.

Now, if the exponent dekatrons record 90 to 99, the discharge in the control ring is shifted by pulses a number of times equal to the units digit recorded in the exponent dekatrons. The addend's significant figures are then distributed to the arithmetical register as before. However, as this distribution is taking place, all the dekatrons in the accumulator stages indicated by stages in the control ring not passed by the discharge on the control ring when the discharge is being shifted according to the numbers 0 to 9 on the exponents units dekatron, are cleared to their ninth cathodes. If the augend is positive, the last dekatron to be cleared also receives a unit increment. The discharge on the control ring returns to the stage indicating the addend's most significant digit after the distribution of the addend's significant figures to the arithmetical register has taken place.

The appropriate action in the above cases is selected while the most significant addend digit is coded during sector 4 in the recoder shown in Figure 3. Selection is made by stepping each exponent dekatron, by applying ten pulses thereto, through ten positions with interdigit carry inhibited, stepping the discharge on the control ring once for each of the ten pulses occurring after the units dekatron passes its ninth cathode and using the pulse from the ninth cathode of the tens exponent dekatron to set up a control circuit (not shown) which determines whether addition is required at all and if addition is required, to inhibit some of the addend's digits or to clear some of the dekatrons in the accumulator, as the case may be.

The pulse from the ninth cathode of the tens exponent dekatron is also used to control the recording of the larger of the two exponents (that is to say, the addend's exponent and the augend's exponent). If the tens exponent dekatron records 0 to 4 (that is the addend's exponent is less than the augend's exponent) then the addition of the addend's exponent to the exponent dekatrons (by multiplying by one during sector 13) causes the exponent dekatrons to record the augend's exponent. Otherwise, the exponent dekatrons are cleared during sector 5 and the addend's exponent added to the exponent dekatrons during sector 13.

The operations described above may be carried out by the use of circuits (not shown) gated by pulses from the phonic wheels in a similar manner to the circuit illustrated in Figure 7.

When necessary, the addend is added to the accumulator by multiplying by one during sector 13, the shift being inhibited by the gate 117 shown in Figure 14.

Subtraction is similar to addition except that the subtrahend is multiplied effectively by minus one by passing an additional pulse, before multiplication, through the gate 107, say, to the trigger 102 in Figure 13. In both subtraction and addition the trigger tube 103 in Figure 13 is inspected during each turn of the phonic wheel to change the state of the trigger 102 if either the augend (or minuend) or the addend (or subtrahend) are negative. The trigger 102 is put off during addition at the end of sector 13 of each rotation of the phonic wheel via the gate 107 (which is, it will be remembered inhibited during the first turn of the phonic wheel during multiplication). Inspection pulses are not passed during addition to the two quintets shown in Figure 13. These quintets may be used for registering the exponent digits in both addition and the appropriate sectors of multiplication.

Carry pulses are treated in addition or subtraction in the same manner as in multiplication. Any carry pulse from the most significant stage of the accumulator is passed to the least significant stage of the accumulator and to the sign dekatron. However, when two positive numbers are in effect added together, or two negative numbers are in effect added together, such a carry pulse or the absence of such a carry pulse respectively indicates that the sum in the accumulator has become too big for the accumulator to handle. That is to say overspill has occurred. In these cases, the sign dekatron records a 1 or an 8 respectively.

During sector 0 after addition or subtraction, pulses are applied to the sign dekatron to clear it to its ninth cathode. The output from the ninth cathode is used in conjunction with appropriate timings of the biases applied to the trigger tubes 41 to 44 in the recoder shown in Figure 7 to flash one or more of these trigger tubes in the manner already described with reference to Figure 7. The flashed trigger tubes of the trigger tubes 41 to 44 then set up a control circuit (not shown) to initiate the following action.

If the sign dekatron originally recorded a 0, one pulse is passed to the sign dekatron to return it to 0.

If the sign dekatron originally recorded a 1, then:

(*a*) A pulse is applied to the units exponent dekatron before the end of sector 0 to record the increased significance of the answer;

(*b*) A pulse is applied to the sign dekatron so that it will record a 0;

(*c*) During sector 1, the discharge in the registers control ring is shifted eight times to select the original least significant stage of the accumulator as the most significant stage of the accumulator; and (*d*) In sectors 2 and 3, pulses are applied to the new most significant dekatron in the accumulator to clear it and then apply one pulse to it so that it records a 1.

If the sign dekatron originally recorded an 8, then the operations (*a*) and (*c*) described above are carried out. The new most significant dekatron in the accumulator is cleared as in operation (*d*) described above, but then this dekatron has eight pulses applied to it so that it records an eight.

If the sign dekatron originally recorded a 9, no further action is taken.

If required, the figures recorded in the exponent's dekatrons, the sign dekatron and the significant figures recorded in the accumulator are then transferred to the store in the manner hereinbefore indicated.

The sign digit (corrected as described above when necessary) will, of course control the recoding of the significant figures recorded in the accumulator into the 1, 2, 3, 9 code in the manner described for the transfer to the store after multiplication.

Figure 17(*a*) illustrates a way in which a cold-cathode switching tube may be used to replace a single quintet of trigger tubes in the arithmetical and other registers. In one such tube, a discharge may be set up between a central anode and any one of ten surrounding cathodes each of which has a separate output. A switching tube of this type is sold under the trade designation GR10A.

In the present example illustrated in Figure 17(*a*) a discharge is set up between the anode and one of the ten cathodes of a switching tube. The cathode from which the discharge takes place depends upon the digit (0 to 9) which is to be recorded in the stage of the register concerned. The code used is simple and straightforward, each cathode being assigned to a separate one of the digits 0 to 9. Thus, in the drawing, the top cathode is assigned to the digit 0, and considered in a clockwise order, the other cathodes are assigned to the digits 1, 2, 3, 4, 5, 6, 7, 8 and 9 respectively. The cathodes are connected as indicated to the points (iii), (iv), (v), (vi) and (vii) in the pulsing unit shown in Figure 14. Each switching tube in the arithmetical register replaces a separate quintet of trigger tubes (such as those shown in Figure 10) and the anode of each trigger tube is connected to a pair of gates (such as the gates 714 and 715 shown in Figure 10) in a corresponding stage of the accumulator circuit.

It is understood that there will shortly be available a cold-cathode switching tube, to be sold under the designation VX9165, in which a discharge may be set up between a central anode and any one or more of ten surrounding cathodes each of which has a separate output. Figure 17(*b*) illustrates a way in which a switching tube of this type may be used to replace all the trigger tubes 1/8 say, in a ten-stage arithmetical register such as that described with reference to Figure 4. In such a register, there would be five such switching tubes each replacing all the trigger tubes representing one of the channels of the five-channel code in the register. Each of the cathodes of a given switching tube is assigned to a significant stage of the register. A discharge is set up between the anode and a cathode when the five-channel code to be set up in the stage of the register to which the cathode is assigned includes the channel represented by the switching tube. The anode of the switching tube is connected to the point (iii), (iv), (v), (vi) or (vii) of the pulsing unit shown in Figure 14 according to whether it represents the channel 1/8, 2/7, 3/6, 4/5 or >4 respectively. The cathodes are connected one to each pair of gates (such as the gates 714 and 715 in Figure 10) in the circuits of various separate accumulator stages.

Figure 18 is a block diagram of the general arrangement of the engine. The figure shows the arithmetical register 31(A). This register includes the main shifting register for holding the significant digits of an operand (the line 37 indicating that this part of the register is connected in the form of a ring), the exponent register (which may also be used during part of the multiplication process as the multiplier register) and the sign register. At 32 and 34 are shown the recoders illustrated in greater detail in Figures 3 and 7 respectively. The pulsing unit is shown at 33(A). At 34(A) is shown the entire accumulator unit. This unit includes the ring accumulator (for holding the significant figures of a number) as illustrated in Figure 9. The line 38 illustrates the ring-like nature of this accumulator. The unit 34(A) also includes the exponent dekatrons and sign dekatron. Also shown in this figure are the gate 36, controlling transfer from the accumulator unit 34(A) to the arithmetical register 31(A), and phonic wheel (at 140), the magnetic storage drum (at 141) and a control register 142.

Successive orders are normally drawn from adjacent storage locations round the drum and the addresses specified by each order are modified while the preceding order is being obeyed. For this modification, each order's modification digit selects one of ten ordinary numbers on the drum. The first four significant figures of the number are added to the first address on the control register 142 specified by the order and the second four figures are added on the control register 142 of the second address specified by the order. The flexibility afforded by this procedure is further extended by the ability to alter not only the modified numbers in the arithmetical unit, but also the orders themselves. The function digits, modification digit and addresses of an order are then treated as exponents, sign and significant figures respectively.

The output from the magnetic drum 141 provides up to three answers at a time; these answers are typed or punched on a card while the computer continues calculating. To do this a simple time-multiplex system is used.

We claim:

1. An electrical decimal digital computing engine comprising an accumulator, a multiplicand register, a multiplier register having at least one stage, means for applying signals to the multiplier register to set up successively on the said stage in a predetermined order of significance a representation of each digit of a multiplier in accordance with a predetermined code, first output means in the said stage for providing an output indicating whether a multiplier digit held in said stage is a digit equal to N which is less than five or a digit equal to $(9-N)$ which is greater than four, a second output means in the multiplier register for providing an output indicating whether the multiplier digit of next less significance to the multiplier digit held in the said stage is less than five or greater than four, a third output means for providing an output from the said stage indicating the value of N, means for calculating either the Nth or the $(N+1)$th multiple of the multiplicand, and means connected to the third output means for carrying out the following functions:

(1) if the first output means indicates that the multiplier digit held in said stage is less than five, applying signals to the accumulator to add
  (*a*) the Nth multiple of the multiplicand to the accumulator if the second output means indicates that the next less significant multiplier digit is less than five, or
  (*b*) the $(N+1)$th multiple of the multiplicand to the accumulator if the second output means indicates that the said next less significant multiplier digit is greater than four, or
(2) if the first output means indicates that the said multiplier digit is greater than four, applying signals to the accumulator to effectively subtract
  (*a*) the Nth multiple of the multiplicand from the accumulator if the second output means indicates that the said next less significant multiplier digit is greater than four, or
  (*b*) the $(N+1)$th multiple of the multiplicand from the accumulator if the second output means indicates that the said next less significant multiplier digit is less than five.

2. An electrical decimal digital computing engine as claimed in claim 1 and wherein the register comprises a first stage including a first gate arranged to be open to pass electrical pulses if a digit set up in the stage is greater than five and a second stage including a second gate arranged to be open to pass electrical pulses if a digit set up in the second stage is greater than five.

3. An electrical decimal digital computing engine as claimed in claim 2 and comprising means for successively setting up the first stage of the register in accordance with each digit of a succession of multiplier digits in a progressively decreasing order of significance, means for shifting the contents of the first stage of the register to the second stage of the register so that the second stage of the register is set up in accordance with the digit according to which the first stage of the register was previously set up, a first trigger connected to the first gate so that a pulse passing through the gate changes the state of the trigger, a second trigger connected to the second gate so that a pulse passing through the gate changes the state of the trigger, means for applying to both of the gates a first pulse before, and a second pulse after, the contents of the first stage has been shifted to the second stage and means for returning the first trigger to a predetermined state before the application of each first pulse.

4. An electrical decimal digit computing engine as claimed in claim 3 and wherein the second stage of the register comprises a first two state device arranged to provide an output when a digit set up in the stage is one of the digits 1 and 8, a second two state device arranged to provide an output when a digit set up in the stage is one of the digits 2 and 7, a third two-state device arranged to provide an output when a digit set up in the stage is one of the digits 3 and 6 and a fourth two-state device arranged to give an output when a digit set up in the stage is one of the digits 4 and 5.

5. An electrical decimal digital computing engine as claimed in claim 4 and wherein the first gate, the second gate and the two-state devices are trigger tubes.

6. An electrical decimal digital computing engine as claimed in claim 4 comprising a network of gates connected to the four two-state devices and to the first trigger, the network of gates being so arranged that it provides an output corresponding to a digit N, where digit N is equal to one of the digits 1 to 4 corresponding to the two-state device which provides an output, or equal to 0 if none of the two-state devices provides an output, if the first trigger is in the predetermined state or to a digit $(N+1)$ if the first trigger is in the other state.

7. An electrical decimal digital computing engine as claimed in claim 3, and wherein means are provided for adding a multiple to the accumulator if the second trigger is in one state and for adding the complement on nines of the multiple to the accumulator if the trigger is in the other state.

8. An electrical decimal digital computing engine as claimed in claim 7 and wherein means are provided for applying a pulse to the second trigger to change its state before the application of any pulse to the second trigger via the said second gate if a product of a multiplicand and a multiplier is to be subtracted from the accumulator.

9. In an electrical decimal digital computing engine, a selector for selecting multiplier factors from a succession of multiplier digits and comprising a multiplier register, having at least one stage means for applying signals to the multiplier register to set up successively on the said stage in a predetermined order of significance a representation of each digit of a multiplier in accordance with a predetermined code, a first output means in the said stage for providing an output indicating whether a multiplier digit held in said stage is a digit equal to N which is less than five or a digit equal to $(9-N)$ which is greater than four, a second output means in the multiplier register for providing an output indicating whether the multiplier digit of next less significance than the digit held in said stage is less than five or greater than four, a third means for providing an output from the multiplier register indicating the value of N and means connected to said third output means for providing an output representing one of the following values for the multiplier factor (1) if the first output means indicates that the multiplier digit held in said stage is less than five
   (a) the value N if the second output means indicates that the said next less significant multiplier digit is less than five, or
   (b) the value $(N+1)$ if the second means indicates that the said next less significant multiplier digit is greater than four, or (2) if the first output means indicates that the said multiplier digit is greater than four
   (a) the value minus N if the second output means indicates that the said next less significant multiplier digit is greater than four, or
   (b) the value minus $(N+1)$ if the second output means indicates that the said next less significant multiplier digit is less than five.

10. In an electrical decimal digital computing engine, a selector of multiplier factors as claimed in claim 9 and wherein the said means for applying signals to the multiplier register comprises means for applying signals to the multiplier register to set up successively on the said stage a representation of multiplier digits in a progressively increasing order of significance.

11. In an electrical decimal digital computing engine, a selector of multiplier factors as claimed in claim 10 and wherein the said second output means comprises a second multiplier register stage in which representations of multiplier digits are set up and wherein there are provided shifting means connected to both of the said stages for shifting representations of multiplier digits from said second stage to the other of said stages.

12. In an electrical decimal digital computing engine, a selector for selecting multiplier factors from a succession of multiplier digits presented thereto in a progressively decreasing order of significance comprising a first multiplier register stage having a first two-state device arranged to give a predetermined output if a multiplier digit N is one of the digits 1 and 8, a second two-state device arranged to give a predetermined output if a multiplier digit N is one of the digits 2 and 7, a third two-state device arranged to give a predetermined output if a multiplier digit N is one of the digits 3 and 6 and a fourth two-state device arranged to give a predetermined output if a multiplier digit N is one of the digits 4 and 5, first gating means arranged to be open if and only if a multiplier digit N is greater than four, a first trigger circuit connected to the first gating means so that its state is changed by any pulse from the said gating means, a second gating means arranged to be open if and only if a multiplier digit of next less significance than that held in the first register stage is greater than four, a second trigger circuit connected to the second gating means so that its state is changed by any pulse from the second gating means, means for applying to the first gating means and to the second gating means collectively a first pulse before and a second pulse after the transfer of each new multiplier digit to the said first register stage, means for applying a pulse to put the second trigger circuit off before the application of the said first pulse, third gating means operated under the control of the two-state devices in the first register stage and of the second trigger circuit to provide an output representing multiplier factor consisting of one of the digits N and $N+1$ according to whether the second trigger circuit is in one of the states off and on respectively and means for providing an output from the first trigger circuit to indicate the sign of the multiplier factor.

13. In an electrical decimal digital computing engine, a selector for selecting multiplier factors as claimed in claim 12 and wherein the second gating means forms part of a second multiplier register stage substantially identical in construction to the said first multiplier register stage and wherein there is provided shifting means connected to the said first multiplier register stage and to the said second multiplier stage for shifting the content of the second multiplier register stage to the first multiplier register stage between the times of occurrence of the said first pulse and the said second pulse.

14. In an electrical decimal digital computing engine, a selector for selecting multiplier factors as claimed in claim 13 and wherein the two-state devices in the said first and second multiplier register stages and the said first and second gating means all comprise trigger tubes.

References Cited in the file of this patent

UNITED STATES PATENTS 2,486,809 Stibitz ---------------- Nov. 1, 1949